(12) United States Patent
Jehan

(10) Patent No.: US 10,990,625 B2
(45) Date of Patent: *Apr. 27, 2021

(54) PLAYLIST PREVIEW

(71) Applicant: Spotify AB, Stockholm (SE)

(72) Inventor: Tristan Jehan, Brooklyn, NY (US)

(73) Assignee: Spotify AB, Stockholm (SE)

( * ) Notice: Subject to any disclaimer, the term of this patent is extended or adjusted under 35 U.S.C. 154(b) by 184 days.

This patent is subject to a terminal disclaimer.

(21) Appl. No.: 16/249,636

(22) Filed: Jan. 16, 2019

(65) Prior Publication Data

US 2019/0258670 A1 Aug. 22, 2019

Related U.S. Application Data

(63) Continuation of application No. 15/667,383, filed on Aug. 2, 2017, now Pat. No. 10,223,447.

(51) Int. Cl.
*G06F 17/30* (2006.01)
*G06F 16/638* (2019.01)
*H04L 12/58* (2006.01)
*G06F 3/0484* (2013.01)
*G06F 16/438* (2019.01)

(52) U.S. Cl.
CPC .......... *G06F 16/639* (2019.01); *G06F 3/0484* (2013.01); *G06F 16/4387* (2019.01); *H04L 51/32* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 8,762,770 B2 * | 6/2014 | Grube | G06F 16/24 714/6.2 |
| 9,645,722 B1 | 5/2017 | Stasior et al. | |
| 9,749,709 B2 | 8/2017 | Fino et al. | |
| 2008/0005279 A1 | 1/2008 | Ge et al. | |
| 2008/0313537 A1 | 12/2008 | Tanaka | |
| 2009/0063511 A1 | 3/2009 | Myers et al. | |
| 2009/0100093 A1 | 4/2009 | Makipaa | |
| 2010/0281376 A1 * | 11/2010 | Meaney | G11B 27/34 715/723 |
| 2011/0191679 A1 | 8/2011 | Lin et al. | |
| 2012/0141095 A1 * | 6/2012 | Schwesinger | H04N 21/4316 386/290 |
| 2013/0013959 A1 * | 1/2013 | Grube | H04N 21/6543 714/6.2 |
| 2013/0246530 A1 | 9/2013 | Lentzitzky | |
| 2014/0043340 A1 | 2/2014 | Sobhy et al. | |
| 2014/0136973 A1 | 5/2014 | Kumar et al. | |
| 2014/0196079 A1 * | 7/2014 | Jannard | H04L 9/0825 725/31 |

(Continued)

*Primary Examiner* — Hung D Le
(74) *Attorney, Agent, or Firm* — Merchant & Gould P.C.

(57) ABSTRACT

A playlist preview is generated to provide a preview of media content items identified by a media playlist. The playlist preview can be created by selecting all or some of the media content items in the playlist, determining preview portions of the selected media content items, and arranging the preview portions with or without a transition effect. The playlist preview can be easily shared with other users through, for example, social media sites.

20 Claims, 22 Drawing Sheets

(56) References Cited

U.S. PATENT DOCUMENTS

| | | | |
|---|---|---|---|
| 2015/0172748 A1* | 6/2015 | Navarro | H04N 21/458 |
| | | | 725/41 |
| 2015/0186386 A1 | 7/2015 | Hilliard | |
| 2016/0140085 A1 | 5/2016 | Reid et al. | |
| 2016/0162125 A1 | 6/2016 | Martella | |
| 2016/0342594 A1* | 11/2016 | Jehan | G06F 16/41 |
| 2017/0249611 A1* | 8/2017 | Trachtenberg | G09G 3/2096 |
| 2017/0359629 A1 | 12/2017 | Fino et al. | |

* cited by examiner

PLAYLIST PREVIEW

CROSS-REFERENCE TO RELATED APPLICATION(S)

This application is a Continuation of U.S. application Ser. No. 15/667,383, filed on Aug. 2, 2017, the disclosure of which is hereby incorporated by reference in its entirety.

BACKGROUND

Media content, such as audio content or video content, is widely consumed in various environments, such as daily, recreation, or fitness activities. Examples of audio content include songs, albums, podcasts, audiobooks, etc. Examples of video content include movies, music videos, television episodes, etc. Using a mobile phone or other media playback device a person can access large catalogs of media content. For example, a user can access an almost limitless catalog of media content through various free and subscription-based streaming services. Additionally, a user can store a large catalog of media content on his or her mobile device.

A playlist can be used to efficiently manage a large catalog of media content. A playlist is used to group a plurality of media content items which are to be played back. For example, a playlist can be used to save favorite media content items for later playback. In certain examples, a playlist may be shared with other users by providing such other users with a link to the playlist, and the other users can access and playback media content items associated with the playlist. This way allows other users to access each of the media content items identified by the playlist, it is still difficult to quickly review all or some of the media content items in the playlist or an overall impression of the media content items in the playlist, especially when the playlist contains a long list of media content items.

SUMMARY

In general terms, this disclosure is directed to a preview of a media content playlist. In one possible configuration and by non-limiting example, the playlist preview is generated and shared with other users in interesting, personalized, and expressive manners. Various aspects are described in this disclosure, which include, but are not limited to, the following aspects.

One aspect is a method for creating a media playlist preview, the method comprising: identifying a plurality of media content items associated with a media playlist; determining preview portions of the plurality of media content items; arranging the preview portions of the plurality of media content items; and generating an audio object for the media playlist preview, the audio object identifying an arrangement of the preview portions.

Another aspect is a media delivery system for delivering media content items to a media playback device, the media delivery system comprising: a processing device; a media data store storing a plurality of playlists; and a computer readable data storage medium storing software instructions that, when executed by the processing device, cause the media delivery system to: identify a plurality of media content items associated with a media playlist; determine preview portions of the plurality of media content items; determine a transition effect; arrange the preview portions of the plurality of media content items and the transition effect, the transition effect arranged between adjacent preview portions; and generate an audio object for the media playlist preview, the audio object identifying an arrangement of the preview portions and the transition effect.

A media playback device comprising: a content output device configured to output media content from media content items; a processing device; and a computer readable data storage medium storing software instructions that, when executed by the processing device, cause the media playback device to: receive a user selection of a media playlist; receive a user selection of media content items from the media playlist; determine preview portions of the plurality of media content items; arrange the preview portions of the plurality of media content items; and generate an audio object for the media playlist preview, the audio object identifying an arrangement of the preview portions.

DETAILED DESCRIPTION

Figure 1:
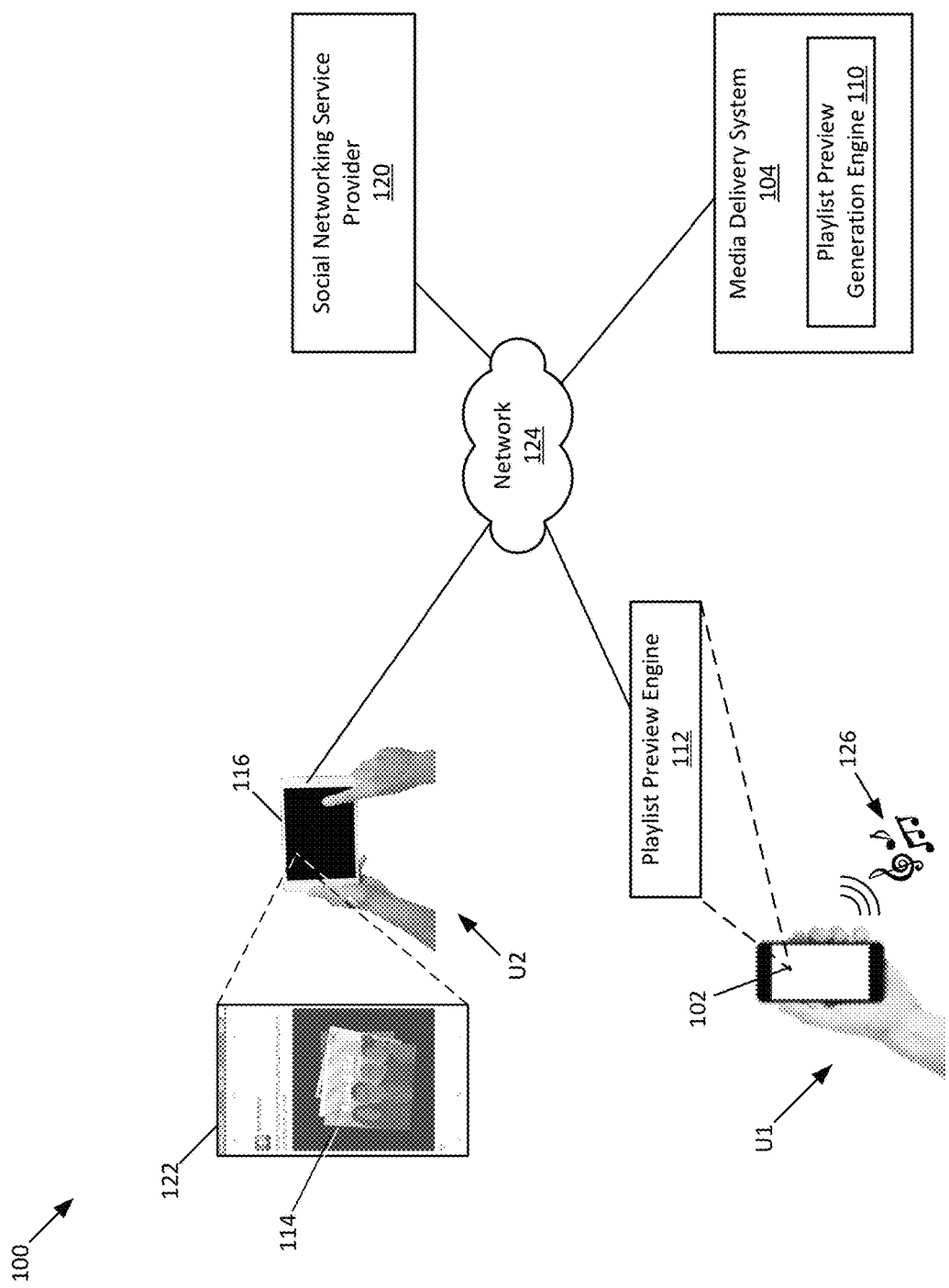
FIG. 1 illustrates an example system for generating a playlist preview and sharing the same between users.

Various embodiments will be described in detail with reference to the drawings, wherein like reference numerals represent like parts and assemblies throughout the several views.

In general, a playlist preview is generated automatically, or interactively with a user, to provide a preview or summary of some or all of the media content items identified by the playlist. In certain examples, the playlist preview of a playlist is created by selecting all or some of the media content items in the playlist, determining preview portions of the selected media content items, and arranging the preview portions with or without a transition effect. The playlist preview of the present disclosure provides a tool for media content item users or consumers to easily share their experiences with media content items, thereby promoting collaborative user experiences. For example, the system of the present disclosure provides, and/or enables users to create, a trailer of the media content items in a playlist and enables users to share it with other users in interesting, personalized, and expressive manners. The playlist preview can be shared in various straightforward and intuitive ways, such as through various social media sites.

FIG. 1 illustrates an example system 100 for generating a playlist preview and sharing the same between users. In this example, the playlist preview generation and sharing system 100 includes a media playback device 102 and a media delivery system 104. In some embodiments, a playlist preview generation engine 110 runs on the media delivery system 104, and a playlist preview engine 112 runs on the media playback device 102. Also shown is a user U1 who uses the media playback device 102. A playlist preview 114 can be generated by either or both of the playlist preview generation engine 110 of the media delivery system 104 and the playlist preview engine 112 of the media playback device 102. The playlist preview 114 can be shared with another user U2 who uses a user computing device 116. In some embodiments, the system 100 can further include a social networking service provider 120 for providing a social networking service 122. The system 100 communicates across a network 124.

It is understood that, in other embodiments, the system 100 may include a plurality of media playback devices 102, a plurality of media delivery systems 104, a plurality of social networking service providers 120, a plurality of user computing devices 116, and/or a plurality of networks 124.

The media playback device 102 operates to play media content items to produce media output 126. In some embodiments, the media content items are provided by the media delivery system 104 and transmitted to the media playback device 102 using the network 124. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof. In this document, the media content items can also be referred to as tracks.

The media delivery system 104 operates to provide media content items to the media playback device 102. In some embodiments, the media delivery system 104 are connectable to a plurality of media playback devices 102 and provide media content items to the media playback devices 102 independently or simultaneously.

The playlist preview generation engine 110 operates to generate a playlist preview 114 for a playlist identifying a plurality of media content items. In some embodiments, the playlist preview 114 is generated by the media delivery system 104, and the media playback device 102 merely operates to play back the playlist preview 114. In other embodiments, the playlist preview generation engine 110 generates the playlist preview 114 in cooperation with the media delivery system 104 including the playlist preview engine 112. In yet other embodiments, the playlist preview engine 112 operates to generate the playlist preview 114, either independently or in cooperation with the media delivery system 104.

The playlist preview engine 112 operates to edit the playlist preview 114 that has been at least partially generated by the playlist preview generation engine 110. In some embodiments, the playlist preview engine 112 provides a user interface for receiving an input from the user U1 for editing the playlist preview 114. In some embodiments, the user input can be transmitted to the media delivery system 104 and used to generate the playlist preview 114 by the playlist preview generation engine 110.

In some embodiments, the playlist preview engine 112 operates to generate a playlist preview 114 independently. In other embodiments, the playlist preview engine 112 cooperates with the media delivery system 104, such as the playlist preview generation engine 110 thereof, to generate the playlist preview 114.

Figure 2:
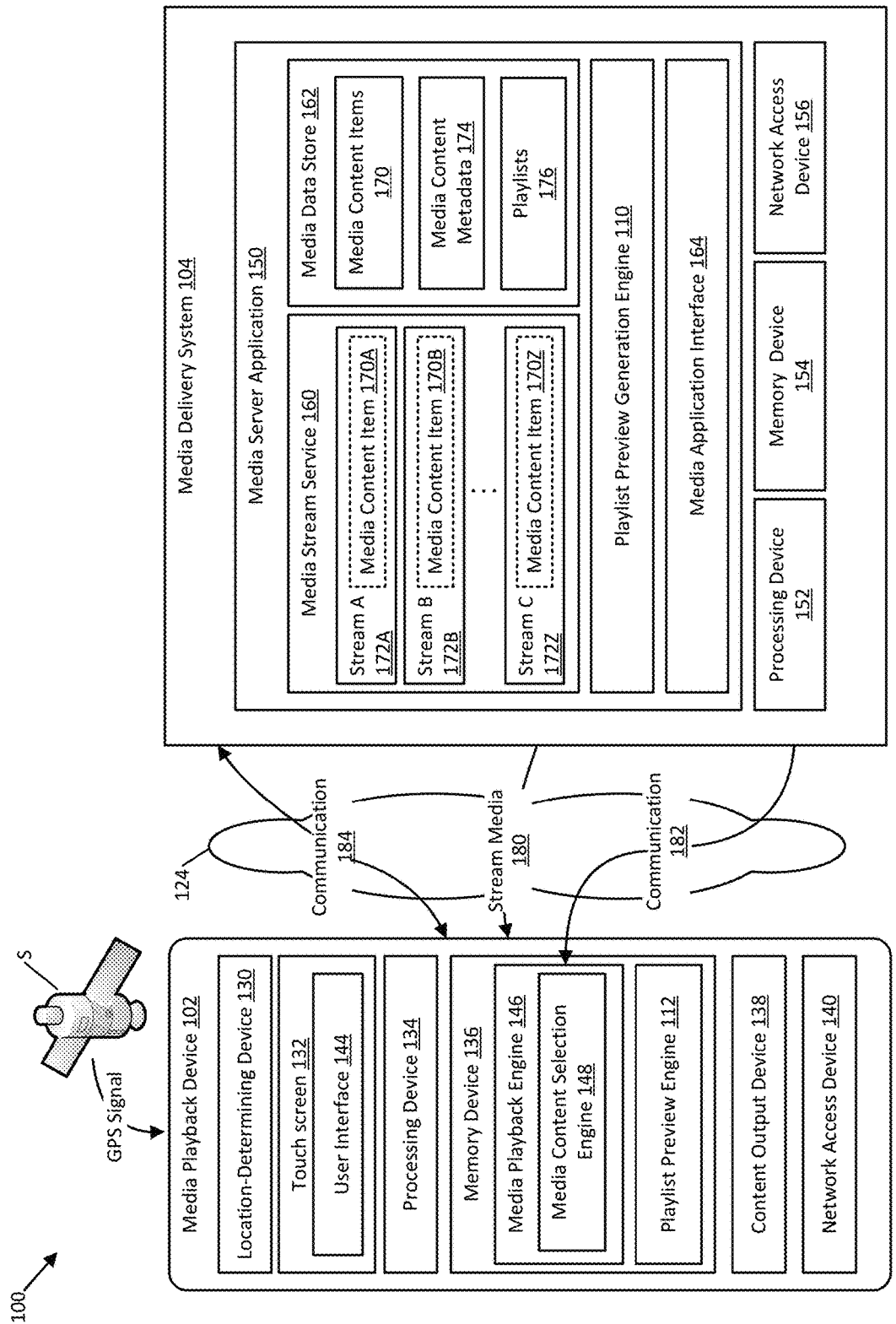
FIG. 2 is a schematic illustration of an example system for generating a playlist preview.

The playlist preview 114 is a preview of a media content playlist, such as a playlist 176 (FIG. 2). A playlist is associated with a plurality of media content items, and a playlist preview 114 provides a summary of that playlist by presenting a set of excerpts from at least some of the plurality of media content items associated with the playlist. In some embodiments, the playlist preview 114 further includes a visual element along with the set of media content excerpts, as described herein in more detail. In this document, the playlist preview 114 is also referred to as a playlist trailer. As described herein, the playlist preview 114 is sharable between users and thus enables users to effectively share their experiences with media content items.

In some embodiments, the playlist preview 114 is shared by another user U2 through the user computing device 116. The user computing device 116 is a computing device of various types, such as a handheld entertainment device, smartphone, tablet, watch, wearable device, or any other type of device capable of playing media content. The user computing device 116 can also be of such types as a laptop computer, desktop computer, television, gaming console, set-top box, network appliance, blue-ray or DVD player, media player, stereo, or radio. Other types of the user computing device are also possible.

In some embodiments, the user computing device 116 is configured as a media playback device 102, or vice versa and thus includes the same functionalities as the media playback device 102 as described herein. In some embodiments, the user computing device 116 is configured similarly to the media playback device 102 as described with reference to FIG. 2. Other configurations of the user computing device 116 are also possible.

The social networking service provider 120 provides the social networking service 122. The social networking service 122 is an online platform that is used by people to build social networks or social relations with other people. Social networking sites incorporate a range of new information and communication tools such as availability on desktop and laptops, mobile devices such as tablet computers and smartphones, digital photo/video/sharing, and blogging. Online community services can also be considered a social network service. Social networking sites allow users to share ideas, digital photos and videos, posts, and inform others about online or real world activities and events with people in their network. Examples of the social networking services include Facebook, Instagram, Snapchat, YouTube, LinkedIn, Twitter, Google+, Wikipedia, Reddit, Pinterest, Vine, Tumblr, Flickr, VK, Meetup, ClassMates, and any other social media apps and messaging apps.

FIG. 2 is a schematic illustration of an example system 100 for generating a playlist preview. As also illustrated in FIG. 1, the system 100 can include the media playback device 102, the media delivery system 104, and the network 124.

As described herein, the media playback device 102 operates to play media content items. In some embodiments, the media playback device 102 operates to play media content items that are provided (e.g., streamed, transmitted, etc.) by a system external to the media playback device such as the media delivery system 104, another system, or a peer device. Alternatively, in some embodiments, the media playback device 102 operates to play media content items stored locally on the media playback device 102. Further, in at least some embodiments, the media playback device 102 operates to play media content items that are stored locally as well as media content items provided by other systems.

In some embodiments, the media playback device 102 is a computing device, handheld entertainment device, smartphone, tablet, watch, wearable device, or any other type of device capable of playing media content. In yet other embodiments, the media playback device 102 is a laptop computer, desktop computer, television, gaming console, set-top box, network appliance, blue-ray or DVD player, media player, stereo, or radio.

In at least some embodiments, the media playback device 102 includes a location-determining device 130, a touch screen 132, a processing device 134, a memory device 136, a content output device 138, and a network access device 140. Other embodiments may include additional, different, or fewer components. For example, some embodiments may include a recording device such as a microphone or camera that operates to record audio or video content. As another example, some embodiments do not include one or more of the location-determining device 130 and the touch screen 132.

The location-determining device 130 is a device that determines the location of the media playback device 102. In some embodiments, the location-determining device 130 uses one or more of the following technologies: Global Positioning System (GPS) technology which may receive GPS signals from satellites S, cellular triangulation technology, network-based location identification technology, Wi-Fi positioning systems technology, and combinations thereof.

The touch screen 132 operates to receive an input from a selector (e.g., a finger, stylus etc.) controlled by the user U. In some embodiments, the touch screen 132 operates as both a display device and a user input device. In some embodiments, the touch screen 132 detects inputs based on one or both of touches and near-touches. In some embodiments, the touch screen 132 displays a user interface 144 for interacting with the media playback device 102. As noted above, some embodiments do not include a touch screen 132. Some embodiments include a display device and one or more separate user interface devices. Further, some embodiments do not include a display device.

In some embodiments, the processing device 134 comprises one or more central processing units (CPU). In other embodiments, the processing device 134 additionally or alternatively includes one or more digital signal processors, field-programmable gate arrays, or other electronic circuits.

The memory device 136 operates to store data and instructions. In some embodiments, the memory device 136 stores instructions for a media playback engine 146 that includes a media content selection engine 148. Further, the memory device 136 stores instructions for the playlist preview engine 112.

The memory device 136 typically includes at least some form of computer-readable media. Computer readable media include any available media that can be accessed by the media playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 138 operates to output media content. In some embodiments, the content output device 138 generates media output 108 (FIG. 1) for the user U. Examples of the content output device 138 include a speaker, an audio output jack, a Bluetooth transmitter, a display panel, and a video output jack. Other embodiments are possible as well. For example, the content output device 138 may transmit a signal through the audio output jack or Bluetooth transmitter that can be used to reproduce an audio signal by a connected or paired device such as headphones or a speaker.

The network access device 140 operates to communicate with other computing devices over one or more networks, such as the network 124. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media playback engine 146 operates to play back one or more of the media content items (e.g., music) to the user U. When the user U is running while using the media playback device 102, the media playback engine 146 can operate to play media content items to encourage the running of the user U, as illustrated with respect to FIG. 22. As described herein, the media playback engine 146 is configured to communicate with the media delivery system 104 to receive one or more media content items (e.g., through the stream media 180), as well as sequencing data generated by the media delivery system 104 for sequencing media content items. Alternatively, such sequencing data can be locally generated by, for example, the media playback device 102.

The media content selection engine 148 operates to retrieve one or more media content items. In some embodiments, the media content selection engine 148 is configured to send a request to the media delivery system 104 for media content items and receive information about such media content items for playback. In some embodiments, media content items can be stored in the media delivery system 104. In other embodiments, media content items can be stored locally in the media playback device 102. In yet other embodiments, some media content items can be stored locally in the media playback device 102 and other media content items can be stored in the media delivery system 104.

The playlist preview engine 112, either independently or in cooperation with the media delivery system 104 including the playlist preview generation engine 110, can operate to generate a playlist preview 114. In other embodiments, the generation of a playlist preview can be performed by the playlist preview generation engine 110 of the media delivery system 104 alone. In yet other embodiments, the playlist preview generation engine 110 operates to primarily generate a playlist preview in cooperation with the media playback device 102.

With still reference to FIG. 2, the media delivery system 104 includes one or more computing devices and operates to provide media content items to the media playback devices 102 and, in some embodiments, other media playback devices as well. In some embodiments, the media delivery system 104 operates to transmit stream media 180 to media playback devices such as the media playback device 102.

In some embodiments, the media delivery system 104 includes a media server application 150, a processing device 152, a memory device 154, and a network access device 156. The processing device 152, memory device 154, and network access device 156 may be similar to the processing device 134, memory device 136, and network access device 140 respectively, which have each been previously described.

In some embodiments, the media server application 150 operates to stream music or other audio, video, or other forms of media content. The media server application 150 includes a media stream service 160, a media data store 162, and a media application interface 164.

The media stream service 160 operates to buffer media content such as media content items 170 (including 170A, 170B, and 170Z) for streaming to one or more streams 172A, 172B, and 172Z.

The media application interface 164 can receive requests or other communication from media playback devices or other systems, to retrieve media content items from the media delivery system 104. For example, in FIG. 2, the media application interface 164 receives communication 182 from the media playback engine 146.

In some embodiments, the media data store 162 stores media content items 170, media content metadata 174, and playlists 176. The media data store 162 may comprise one or more databases and file systems. Other embodiments are possible as well. As noted above, the media content items 170 may be audio, video, or any other type of media content, which may be stored in any format for storing media content.

The media content metadata 174 operates to provide various pieces of information associated with the media content items 170. In some embodiments, the media content metadata 174 includes one or more of title, artist name, album name, length, genre, mood, era, etc.

In some embodiments, the media content metadata 174 includes acoustic metadata, cultural metadata, and explicit metadata. The acoustic metadata may be derived from analysis of the track refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 174, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML, or other file. All or portions of the metadata may be stored in separate files associated with specific tracks. All or portions of the metadata, such as acoustic fingerprints and/or description vectors, may be stored in a searchable data structure, such as a k-D tree or other database format.

The playlists 176 operate to identify one or more of the media content items 170. In some embodiments, the playlists 176 identify a group of the media content items 170 in a particular order. In other embodiments, the playlists 176 merely identify a group of the media content items 170 without specifying a particular order. Some, but not necessarily all, of the media content items 170 included in a particular one of the playlists 176 are associated with a common characteristic such as a common genre, mood, or era.

In some embodiments, playlists can be manually created, modified, and managed by users. In other embodiments, playlists can be automatically created by the media delivery system 104, the media playback device 102, and any other computing devices and presented or recommended to the users.

Referring still to FIG. 2, the network 124 is an electronic communication network that facilitates communication between the media playback device 102 and the media delivery system 104. An electronic communication network includes a set of computing devices and links between the computing devices. The computing devices in the network use the links to enable communication among the computing devices in the network. The network 124 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 124 includes various types of links. For example, the network 124 can include wired and/or wireless links, including Bluetooth, ultra-wideband (UWB), 802.11, ZigBee, cellular, and other types of wireless links. Furthermore, in various embodiments, the network 124 is implemented at various scales. For example, the network 124 can be implemented as one or more local area networks (LANs), metropolitan area networks, subnets, wide area networks (such as the Internet), or can be implemented at another scale. Further, in some embodiments, the network 124 includes multiple networks, which may be of the same type or of multiple different types.

Although FIG. 2 illustrates only a single media playback device 102 communicable with a single media delivery system 104, in accordance with some embodiments, the media delivery system 104 can support the simultaneous use of multiple media playback devices, and the media playback device can simultaneously access media content from multiple media delivery systems. Additionally, although FIG. 2 illustrates a streaming media based system for managing sequencing of media content items, other embodiments are possible as well. For example, in some embodiments, the media playback device 102 includes a media data store 162 and the media playback device 102 is configured to perform management of sequencing between media content items without accessing the media delivery system 104. Further in some embodiments, the media playback device 102 operates to store previously streamed media content items in a local media data store.

Figure 3:
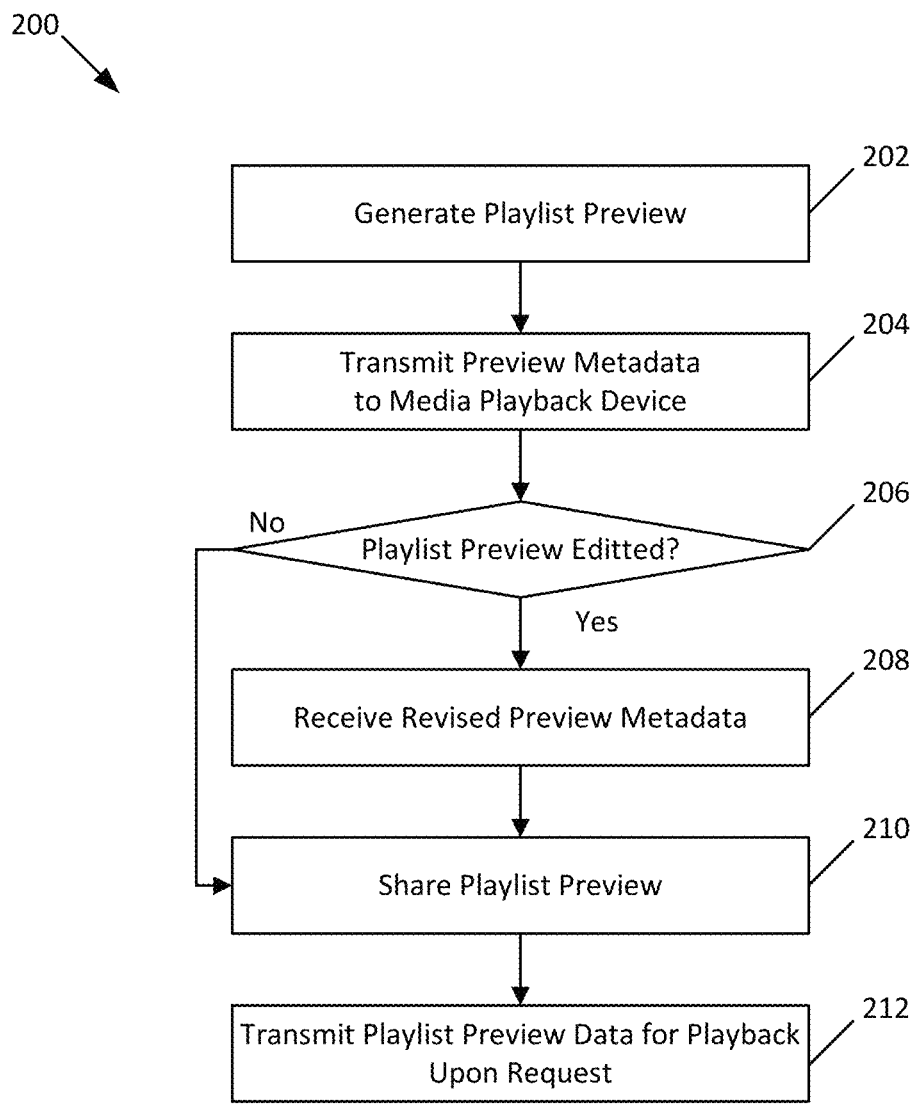
FIG. 3 illustrates an example method for generating and sharing a playlist preview.

FIG. 3 illustrates an example method 200 for generating and sharing a playlist preview. In this example, the method 200 is described as being performed in the media delivery system 104 including the playlist preview generation engine 110. However, in other embodiments, only some of the processes in the method 200 can be performed by the media delivery system 104. In other embodiments, all or some of the processes in the method 200 are performed by the media playback device 102. In yet other embodiments, all or some of the processes in the method 200 are performed by both of the media delivery system 104 and the media playback device 102 in cooperation.

The method 200 can begin at operation 202, in which a playlist preview 114 is generated. In some embodiments, the media delivery system 104 operates to automatically generate the playlist preview 114. The playlist preview 114 can be generated solely by the media delivery system 104 without interaction with the media playback device 102 or other devices. In other embodiments, the media delivery system 104 can communicate with the media playback device 102 to receive data, such as user edit inputs, usable to generate and/or modify a playlist preview 114. In yet other embodiments, the playlist preview 114 can be generated by the media playback device 102 independently from the media delivery system 104. In yet other embodiments, the playlist preview 114 can be generated locally in either the media playback device 102 or the media delivery system 104. An example method for generating a playlist preview is further described with reference to FIGS. 4 and 15.

At operation 204, where the playlist preview 114 is generated in the media delivery system 104 or other devices than the media playback device 102, the media delivery system 104 transmits metadata for the playlist preview (also referred to herein as preview metadata) to the media playback device 102. The preview metadata is metadata that provide various pieces of information associated with the playlist preview. The preview metadata can include information usable to retrieve and play back the associated playlist preview on various devices, such as the media playback device 102, the user computing device 116, and any other computing devices. In other embodiments where the playlist preview 114 is generated by the media playback device 102, the operation 204 can be omitted in the method 200.

At operation 206, the media delivery system 104 determines whether the playlist preview is edited. In some embodiments, the playlist preview can be edited using the media playback device 102 upon a user request. For example, the media playback device 102 provides a user interface, such as the user interface 144 (FIG. 2), to receive a user input of an edit request for editing the playlist preview. In other embodiments, the playlist preview can be edited by the media delivery system 104. For example, the media playback device 102 receives a user input of an edit request and transmits the edit request to the media delivery system 104. The media delivery system 104 can then edit the playlist preview based on the edit request. Alternatively, the media delivery system 104 can directly receive an edit request and edit the playlist preview based on the edit request.

If it is determined that the playlist preview is edited ("Yes" at this operation), the method 200 continues at operation 208. Otherwise ("No" at this operation), the method 200 moves on to operation 210.

At operation 208, the media delivery system 104 receives revised preview metadata from the media playback device 102 after the playlist preview has been edited by the media playback device 102. For example, when the playlist preview is edited, the preview metadata is accordingly modified, and such modified preview metadata is transmitted to the media delivery system 104.

At operation 210, the media delivery system 104 enables sharing the playlist preview. In some embodiments, the media delivery system 104 transmits the metadata of the playlist preview (i.e., the preview metadata, or the revised preview metadata if the playlist preview is edited) to the media playback device 102 so that the user shares the playlist preview by using information contained in the metadata. For example, the user can share a link to the playlist preview on various websites or services, such as the social networking service 122 (FIG. 1).

At operation 212, the media delivery system 104 transmits data for playback of the playlist preview to a computing device, such as the user computing device 116, upon a request for the playlist preview from that computing device. For example, when a user of the user computing device 116 clicks on a link to the playlist preview (e.g., clicking on the image of the playlist preview while played back), the user computing device 116 sends a request to the media delivery system 104, and the media delivery system 104 transmits the data for the playlist preview to the user computing device 116 so that the user computing device 116 plays back the playlist preview based on the received playlist preview data.

Figure 4:
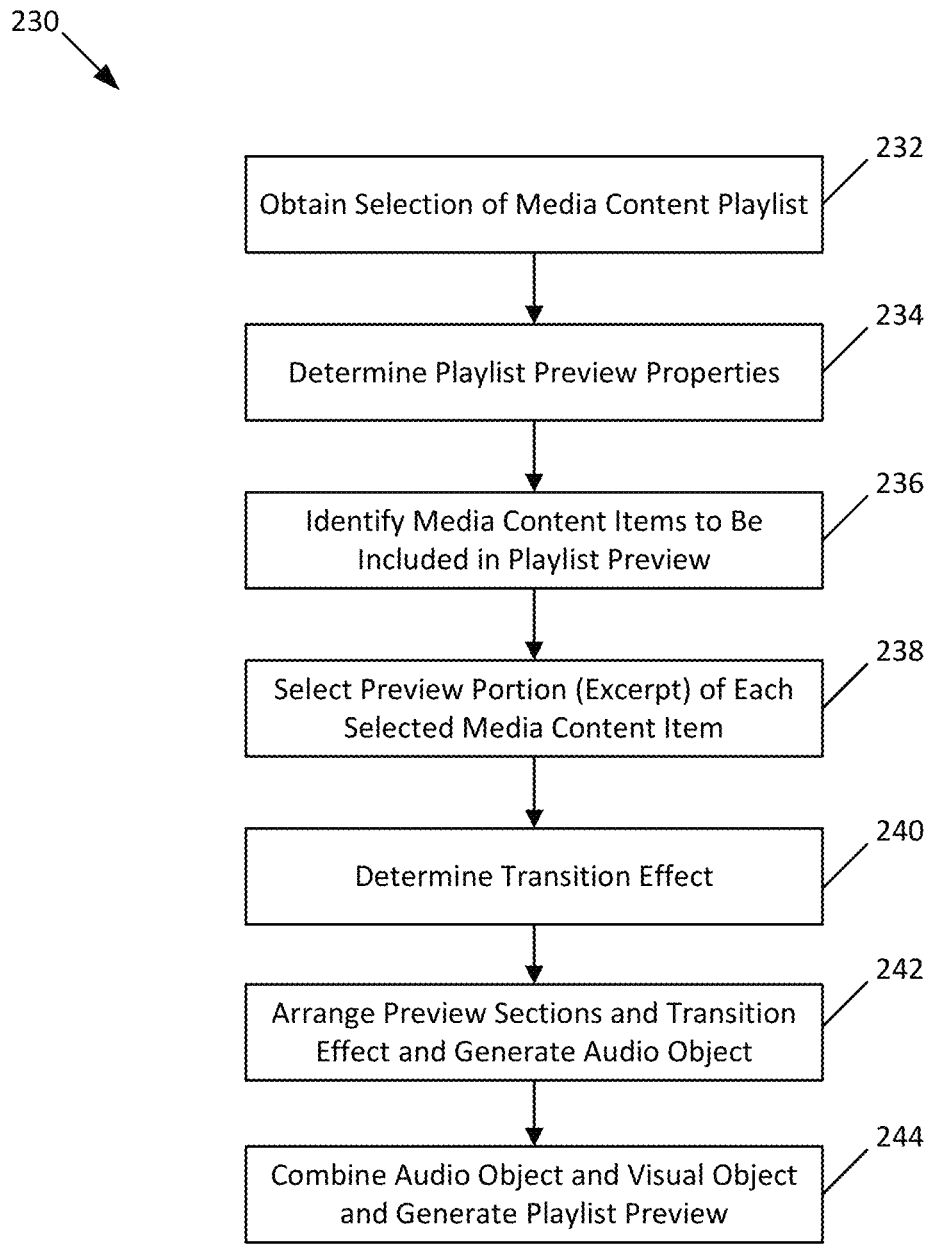
FIG. 4 illustrates an example method for generating a playlist preview.

FIG. 4 illustrates an example method 230 for generating a playlist preview. In this example, the method 230 is described as being performed in the media delivery system 104 including the playlist preview generation engine 110. However, in other embodiments, only some of the processes in the method 230 can be performed by the media delivery system 104. In other embodiments, all or some of the processes in the method 230 are performed by the media playback device 102. In yet other embodiments, all or some of the processes in the method 230 are performed by both of the media delivery system 104 and the media playback device 102 in cooperation.

The method 230 can begin at operation 232, in which the media delivery system 104 obtains a selection of a media content playlist, such as a playlist 176 (FIG. 2), for which a playlist preview is generated. In some embodiments, a playlist is manually selected by a user through, for example, the media playback device 102. In other embodiments, the playlist can be automatically selected by the media playback device 102, the media delivery system 104, or any other computing device. In yet other embodiments, the playlist can be predetermined for a particular purpose, such as to promote a playlist associated with a set of predetermined media content items. In yet other embodiments, the playlist can be randomly selected.

At operation 234, the media delivery system 104 determines one or more properties of a playlist preview to be generated. In some embodiments, the media delivery system 104 receives a user input of such playlist preview properties through, for example, the media playback device 102. In other embodiments, the media delivery system 104 can automatically evaluates the playlist or the media content items associated with the playlist and identify the properties of a playlist preview for the playlist based on the evaluation. An example method for determining the playlist preview properties is further described with reference to FIG. 5.

At operation 236, the media delivery system 104 identifies media content items that will be included in the playlist preview. In some embodiments, the media delivery system 104 operates to select some of the media content items associated with the selected playlist and use the selected media content items for generating the playlist preview. In other embodiments, all of the media content items associated with the selected playlist are used for the playlist preview. In some embodiments, the media content items to be used in the playlist preview are automatically selected by the media delivery system 104 based on one or more criteria. In other embodiments, the media content items for the playlist preview are randomly selected by the media delivery system 104. In yet other embodiments, the media content items for the playlist preview are manually selected by a user through, for example, the media playback device 102. Example methods for identifying media content items for a playlist preview are described and illustrated in more detail with reference to FIG. 6.

At operation 238, the media delivery system 104 selects a preview portion of each of the selected media content items. In some embodiments, the preview portion of each media content item is an excerpt from the media content item. The prevent portion can be selected as a portion of the media content item that represents the characteristics or attributes of the media content item. The preview portion of each media content item can be identified in various methods, some of which are described and illustrated with reference to FIGS. 8-10.

At operation 240, the media delivery system 104 determines a transition effect. In some embodiments, the transition effect is a sound effect arranged between the preview portions of the selected media content items to provide smooth, personalized, and interesting transitions between the preview portions. In some embodiments, the transition effect is automatically determined by a transition effect rule. The transition effect rule includes a list of default sound effects associated with one or more features that represent the playlist or the selected media content items from the playlist. Such features of the playlist or the selected media content items thereof can be obtained based on the metadata, such as the metadata 174, of the playlist or the selected media content items. In other embodiments, the transition effect is manually determined by a user through, for example, the media playback device 102. In yet other embodiments, the transition effect includes no effect so that no sound effect is provided between the preview portions of the selected media content items. An example method for identifying a transition effect is further described and illustrated with reference to FIG. 11.

At operation 242, the media delivery system 104 operates to arrange the preview portions of the selected media content items, thereby generating an audio object of the playlist preview. In addition, the media delivery system 104 can arrange the transition effect between the preview portions as the preview sections are arranged. The preview portions can be arranged in various manners based on one or more sequencing criteria. An example method of arranging the preview portions and the transition effect is described and illustrated in more detail with reference to FIG. 12.

At operation 244, the media delivery system 104 operates to generate a playlist preview using the audio object. In some embodiments, the media delivery system 104 obtains a visual object and combines the visual object with the audio object to generate the playlist preview. The visual object includes a visual effect that can be synchronized with the audio object to present a visual preview of the playlist as well as an audio preview of the playlist. The visual effect can include various effects, such as an animated motion of turning album cover images. An example method for generating a playlist preview with visual and audio objects is further described and illustrated with reference to FIG. 13.

Figure 5:
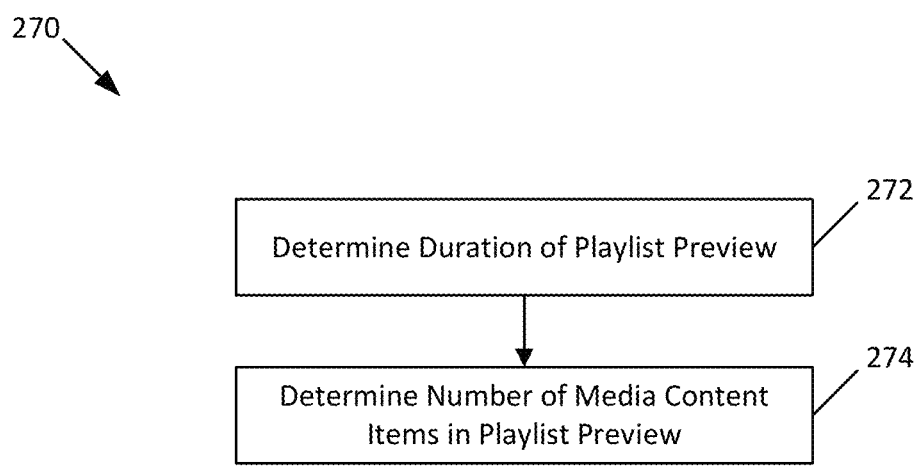
FIG. 5 illustrates an example method for determining properties of a playlist preview being generated.

FIG. 5 illustrates an example method 270 for determining the properties of a playlist preview that is to be generated. In some embodiments, the method 270 is used to perform the operation 234 in the method 230 as described in FIG. 4. The method 270 is described as being performed in the media delivery system 104 either independently or in cooperation with the media playback device 102. However, in other embodiments, only some of the processes in the method 270 can be performed by the media delivery system 104. In other embodiments, all or some of the processes in the method 270 are performed by the media playback device 102. In yet other embodiments, all or some of the processes in the method 270 are performed by both of the media delivery system 104 and the media playback device 102 in cooperation.

In this example, the method 270 begins at operation 272 in which the media delivery system 104 determines a duration of the playlist preview to be generated. In this operation, the media delivery system 104 determines how long the entire playlist preview runs. In some embodiments, a user can select and input the duration of the playlist preview through the media playback device 102, which then transmits it to the media delivery system 104. In other embodiments, the media delivery system 104 automatically determines the duration of the playlist preview based on various factors. For example, one example factor is a website or application, such as a website or social networking service, where the playlist preview is posted. Certain websites or social networking services may have a time limit of an audio or video file that can be uploaded, such as ten (10) seconds in Snapchat. Other various factors can be considered in other embodiments.

At operation 274, in addition to the duration of the playlist preview, the media delivery system 104 determines a number of media content items to be used in the playlist preview. Similarly to the operation 272, in some embodiments, a user can select the number of media content items through the media playback device 102, which then transmits it to the media delivery system 104. In other embodiments, the media delivery system 104 automatically determines the number of media content items based on various factors, such as a duration of the entire playlist preview and a duration of each media content item in the playlist preview. Other various factors can be considered in other embodiments.

In addition or alternatively, the media delivery system 104 can determine a duration of a preview portion of each media content item selected for the playlist preview. In some embodiments, the durations of the preview portions of the selected media content items are identically determined so that each of the selected media content items takes the same amount of time in the playlist preview. In other embodiments, at least one of the selected media content items has a different duration of its preview portion than the preview portions of the other selected media content items.

In addition or alternatively, the media delivery system 104 can determine a duration of the transition effect as described herein. In some embodiments, the duration of the preview portions, the duration of the transition effect, and/or the number of the selected media content items are varied and combined differently to meet the duration of the playlist preview. As a simple example, to make a 15-second playlist preview, three media content items, each playing 5 seconds, or five media content items, each playing 3 seconds, can be selected assuming there is no transition effect.

Figure 6:
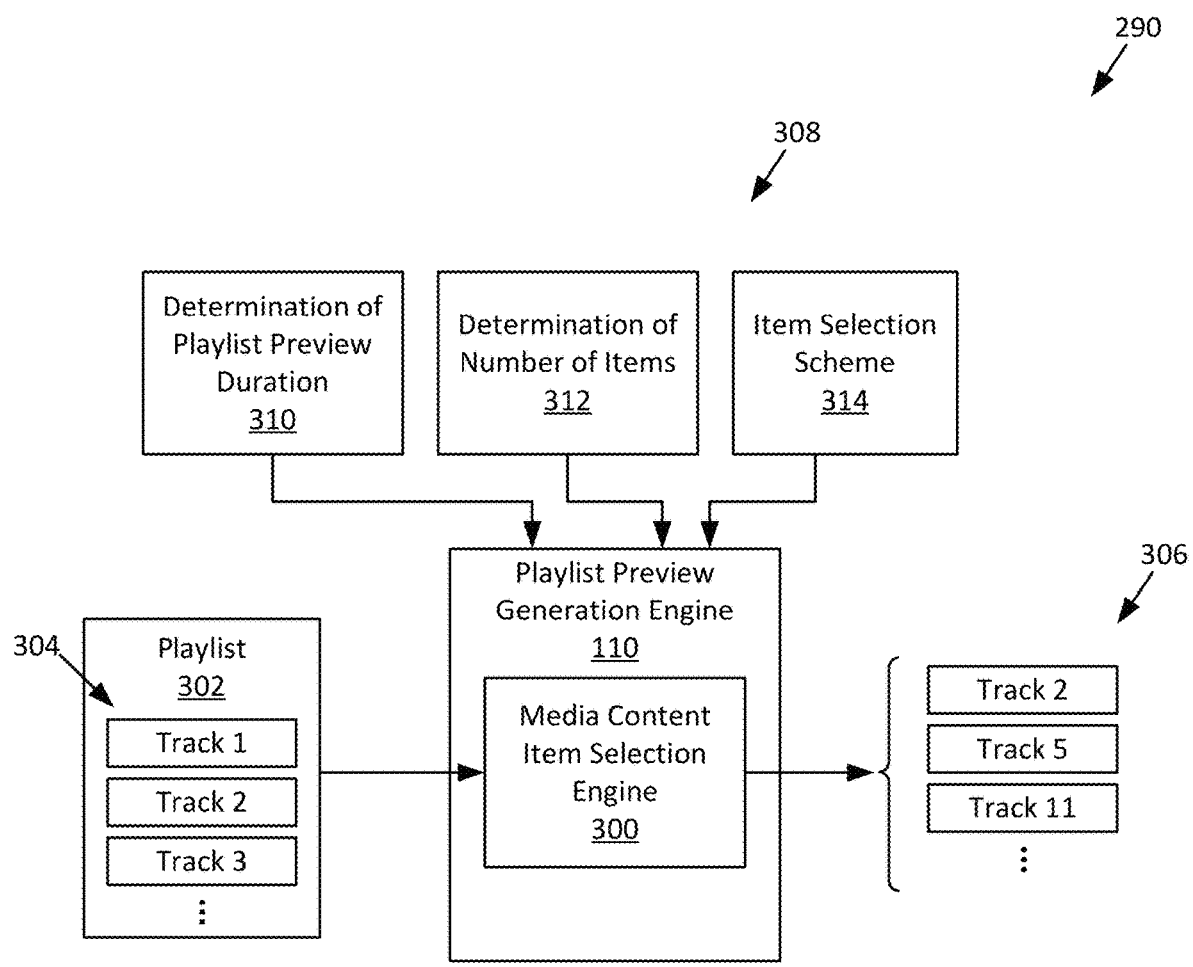
FIG. 6 illustrates an example system for identifying media content items to be used for a playlist preview.

FIG. 6 illustrates an example system 290 for identifying media content items to be used for a playlist preview. In some embodiments, the system 290 is used to perform the operation 236 in the method 230 as described in FIG. 4.

In some embodiments, the media delivery system 104 includes a media content item selection engine 300, which can be included in the playlist preview generation engine 110. In this example, the media delivery system 104 including the media content item selection engine 300 is primarily described as performing the selection of media content items for the playlist preview. In other embodiments, however, other devices, such as the media playback device 102, can be used independently or along with the media delivery system 104 to select media content items for the playlist preview.

In this example, the media content item selection engine 300 receives a playlist 302 for which a playlist preview is created. As described with respect to the operation 232 herein (FIG. 4), the playlist 302 can be selected either manually or automatically from a plurality of existing playlists, such as the playlists 176 (FIG. 2). In other embodiments, the playlist 302 is newly created by a user or automatically by the media delivery system 104 or the media playback device 102. The playlist 302 includes a plurality of media content items 304, which are also referred to herein as tracks.

The media content item selection engine 300 operates to identify one or more of the media content items 304 as selected media content items 306 based on one or more criteria 308.

In some embodiments, the criteria 308 includes at least one of a playlist preview duration 310, a number of media content items 312, and an item selection scheme 314. The playlist preview duration 310 and the number of media content items 312 can be determined as shown in the operations 272 and 274 of the method 270, respectively, as illustrated in FIG. 5.

The item selection scheme 314 provides one or more factors to consider for selecting media content items from the playlist 302. Examples of such factors are described with reference to FIG. 7.

Although it is described in FIG. 6 that the media content items can be automatically selected by the media delivery system 104, it is also possible in other embodiments that such media content items for a playlist preview are manually selected by a user from the media content items in the playlist.

Figure 7:
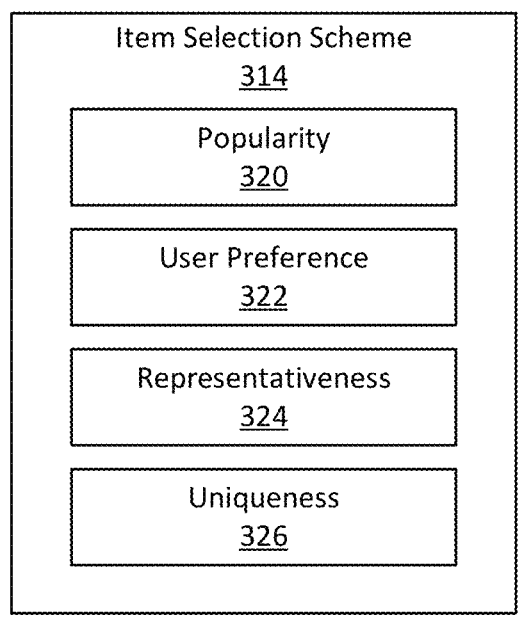
FIG. 7 illustrates an example item selection scheme.

FIG. 7 illustrates an example of the item selection scheme 314. In this example, the item selection scheme 314 includes various factors, such as popularity 320, user preference 322, representativeness 324, and uniqueness 326. In other embodiments, other factors may be included and considered as the item selection scheme 314.

In some embodiments, the media content item selection engine 300 uses one of the factors in the item selection scheme 314. In other embodiments, the media content item selection engine 300 uses any combination of two or more of the factors in the item selection scheme 314.

According to the popularity 320, the media content item selection engine 300 can select the most popular media content items from the playlist 302. The popularity of media content items can be measured in various ways. In some embodiments, the popularity of media content items can be determined based on the number of playbacks of media content items in the playlist 302. By way of example, where five media content items are to be selected based on the determination of a number of media content items 312, the media content item selection engine 300 can select five media content items that are most played back by the user of the playlist 302. In this example, the media content item selection engine 300 can alternatively select five media content items in the playlist 302 that are most played back in general, such as by all users of the media content service (e.g., a media content streaming service) using the media delivery system 104. In yet other embodiments, the popularity of media content items are determined from other sources, such as user reviews, expert reviews, rankings, and any other suitable ways to evaluate the popularity of media content items.

According to the user preference 322, the media content item selection engine 300 can select a predetermined number of media content items from the playlist 302 that are preferred by the user of the playlist 302. In some embodiments, the media content item selection engine 300 receives an input of the user's favorite media content items. By way of example, where five media content items are to be selected based on the determination of a number of media content items 312, the media content item selection engine 300 enables the user to select and input five favorite songs from the playlist 302. In other embodiments, the media content item selection engine 300 can automatically select a predetermined number of the user's favorite media content items.

In some embodiments, the user's favorite media content items can be selected as media content items by the user's favorite artist. For example, the media content item selection engine 300 enables the user to select the user's favorite artist and selects a predetermined number of media content items by the artist from the playlist 302. In other examples, the media content item selection engine 300 can automatically determine the user's favorite artist and select a predetermined number of media content items by the artist from the playlist 302.

In some embodiments, the user's favorite media content items can be selected as media content items based on various features associated with the playlist or the media content items in the playlist. In some embodiments, such features can be identified from the media content metadata (such as the media content metadata 174 including acoustic metadata, cultural metadata, and explicit metadata). In addition or alternatively, such features include other characteristics such as energy, danceability, and runnability of media content items. By way of example, the media content item selection engine 300 enables the user to input, or automatically determine, the user's favorite genre, and selects a predetermined number of media content items having the genre from the playlist 302. Other features are similarly applicable to determine the user's favorite media content items.

According to the representativeness 324 of the playlist 302, the media content item selection engine 300 selects a predetermined number of media content items that are representative of the playlist 302. In some embodiments, the media content item selection engine 300 clusters all the media content items 304 in the playlist 302 and determine a group of media content items that can best represent the playlist. For example, all of the media content items identified by the playlist are clustered and a center of the cluster can be determined based on various criteria. One example method of determining the center of the cluster is to calculate a vector for one or more acoustic features (e.g., timbre, harmony, and rhythm) and/or one or more high-level subjective aptitudes (e.g., danceability, energy, and runnability) of each media content item, and then evaluate similarity based on distances between the vectors in multi-dimensional space. Other methods are also possible.

According to the uniqueness 326, the media content item selection engine 300 can select a predetermined number of media content items from the playlist 302 that are most unique from the remaining media content items. For example, media content items having most extreme characteristics, media content items that vary drastically from one another, and/or the most varied type of media content items can be selected.

Figure 8:
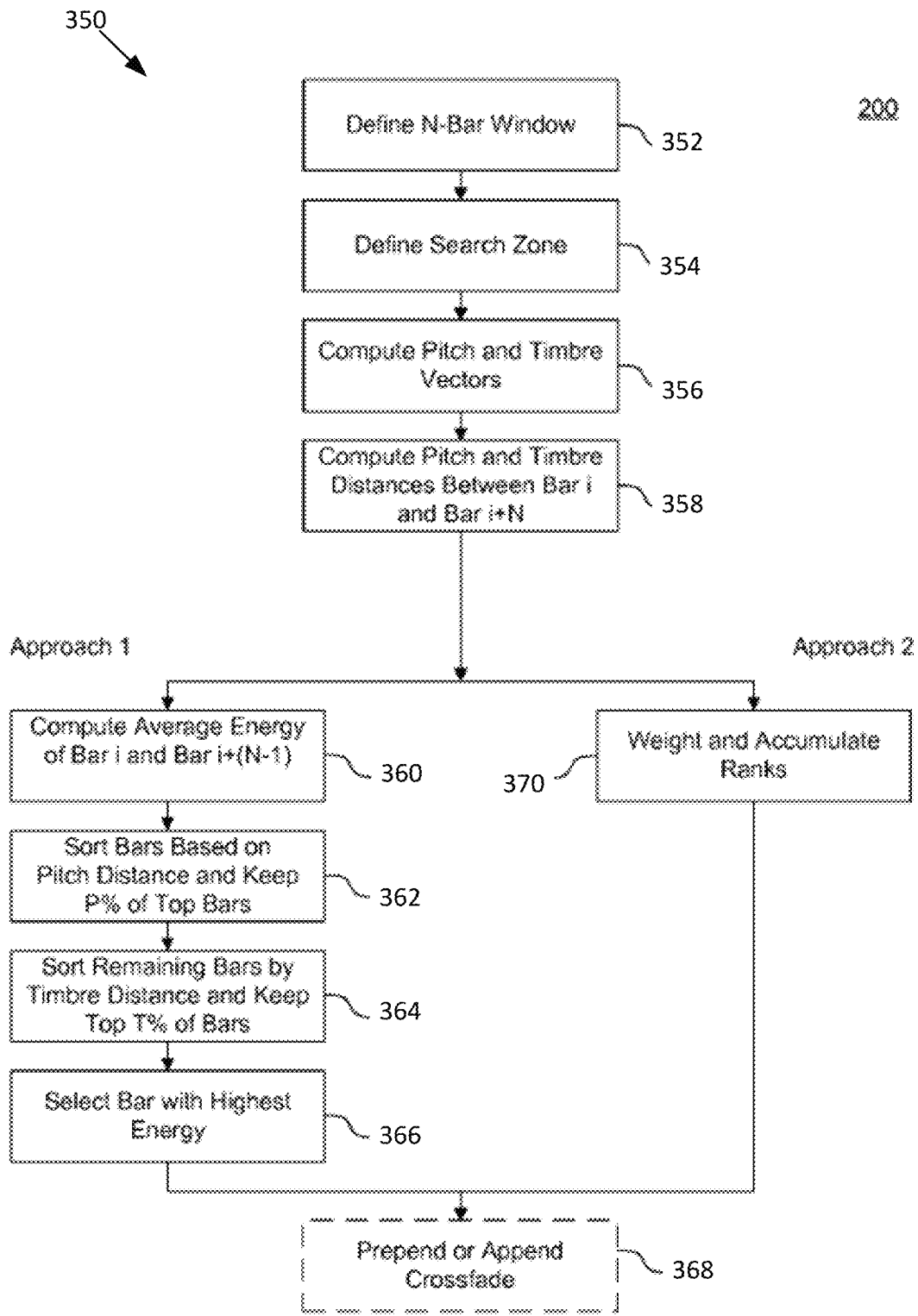
FIG. 8 illustrates an example method for selecting preview portions of selected media content items.
Figure 9:
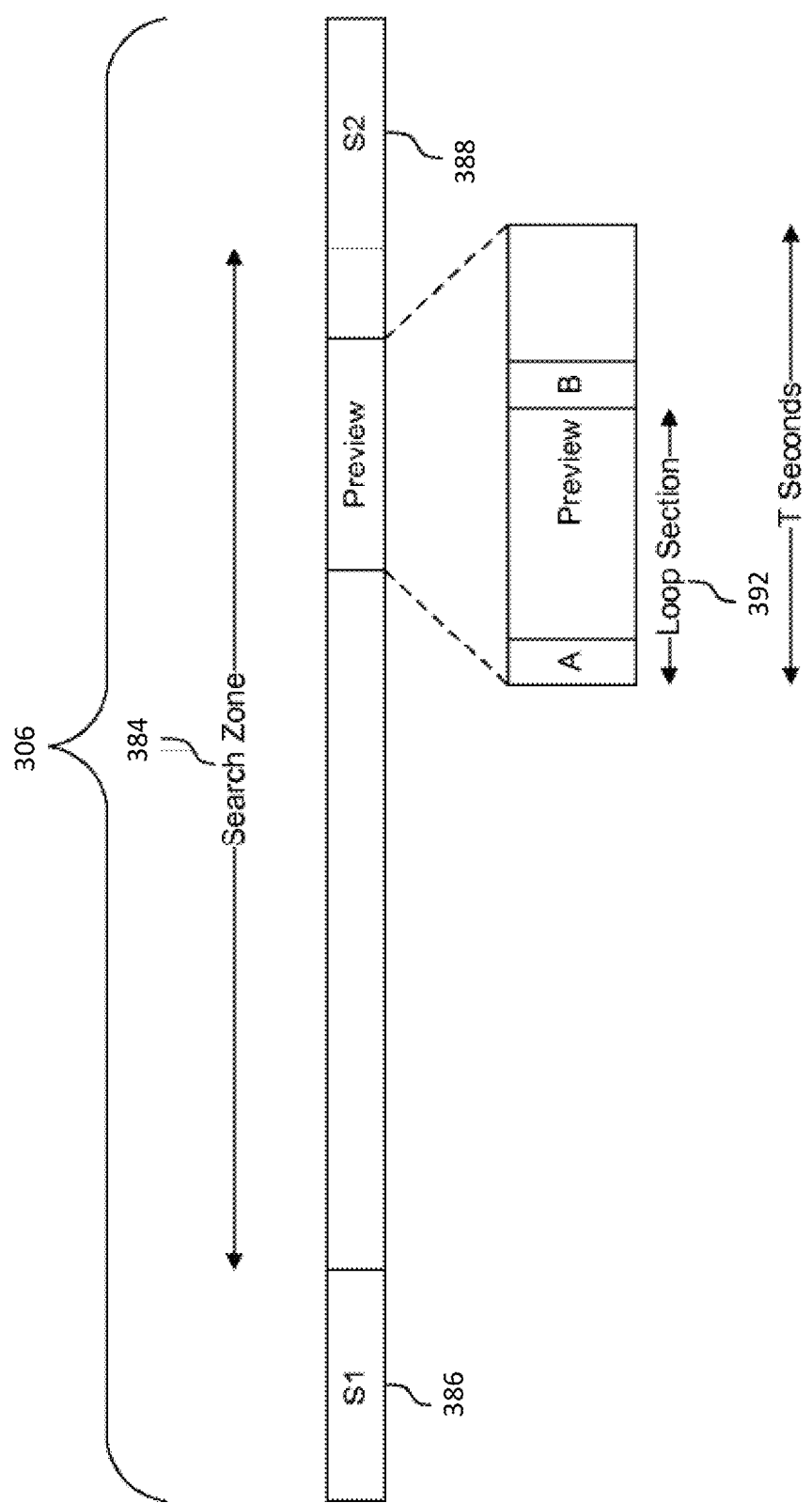
FIG. 9 illustrates a media content item having a search zone from which a loop section is extracted in accordance with the method of FIG. 8.
Figure 10:
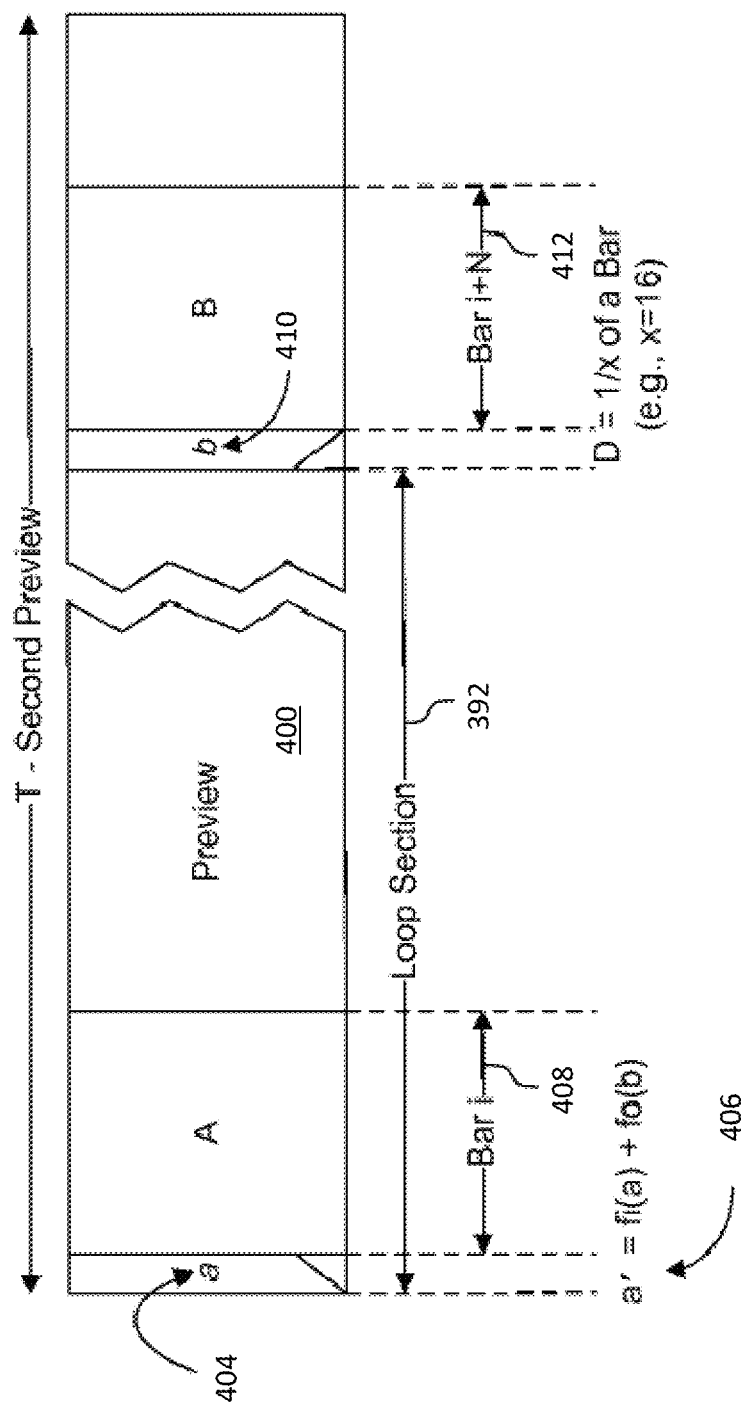
FIG. 10 illustrates an example preview portion of duration.

Referring to FIGS. 8-10, an example method for selecting preview portions of the selected media content items 306 is described. In some embodiments, the method is used to perform the operation 236 in the method 230 as described in FIG. 4. Although the method is primarily described herein as determining the preview portions of the selected media content items 306, the method is also applicable for determining preview portions of the media content items 304 of the playlist 302 or of any media content item.

In some embodiments, a preview portion of a selected media content item 306 is determined by extracting a portion of the selected media content item 306 using a fixed ratio of the total duration of the selected media content item. In other embodiments, the media content item selection engine 300 automatically determines, as a preview portion, a portion of the selected media content item that is usable as a proxy for what can be considered the most exciting, representative, or interesting section of the media content item. One example operation of the media content item selection engine 300 for selecting preview portions is described in U.S. Patent Application No. 2016/0342594, filed May 19, 2015, titled EXTRACTING AN EXCERPT FROM A MEDIA OBJECT, the disclosure of which is hereby incorporated by reference in its entirety, and summarized with reference to FIGS. 8-10.

FIG. 8 illustrates an example method 350 for selecting preview portions of the selected media content items 306. FIG. 9 illustrates a media content item 306 having a search zone from which a loop section is extracted in accordance with the method 350.

The method 350 is described as being performed in the media delivery system 104 either independently or in cooperation with the media playback device 102. However, in other embodiments, only some of the processes in the method 350 can be performed by the media delivery system 104. In other embodiments, all or some of the processes in the method 350 are performed by the media playback device 102. In yet other embodiments, all or some of the processes in the method 350 are performed by both of the media delivery system 104 and the media playback device 102 in cooperation.

Prior to performing the method 350, an acoustic analysis can be performed on a media content item 306 to provide acoustic analysis data that describes the structure and musical content of the media content item. In one embodiment, the acoustic analysis data includes pitch, timbre, and energy. The acoustic analysis mechanism takes a digital audio file, for example, from disk, (e.g. mp3, m4a, wav, aif, mov, mpeg, fly), or audio data piped in on a command line and generates a file (e.g., JSON-formatted text file) that describes the structure and musical content of the media content item. In addition to pitch, timbre and energy, the acoustic analysis data can also include sections, downbeats, rhythm, and the like. In an example embodiment, the mechanism that performs the acoustic analysis incorporates principles of psychoacoustics, music perception, and adaptive learning to model both the physical and cognitive processes of human listening to output a description of attributes such as musical events, structures, and global attributes such as key, loudness, time signature, tempo, beats, sections, harmony, and the like. It should be understood that other presently known or future acoustic analysis data processor or processing techniques can be used to obtain such acoustic analysis data.

At operation 352, an N-bar window corresponding to N-bar loop section 392 is defined, as shown in FIG. 10. At operation 354, a search zone 384 is defined. How the N-bar loop is defined will now be described in more detail.

As illustrated in FIG. 10, for a time signature AB where B is a numeral indicating a note value that represents one beat (the beat unit) and A is a numeral indicating how many such beats are grouped together in a bar, the length of a sliding window is computed according to the equation N×A, where N is the number of bars. In this example, the sliding window is the same length as the loop section 392.

In one example implementation, N is selected empirically based on the desired length of the loop and the phrasing of the media content being processed. Popular music, for example, progresses in phrase lengths that are multiples of two (2) bars and have a 4/4 time signature. Thus, in the case where the tempo is 56 beats per minute (bpm), to obtain an approximately 30 second loop, in this example implementation N is set to eight (8). For a 4/4 time signature, for example, the sliding window would therefore be 8×4=32-beats long. An 8-bar loop would thus reach approximately 30 seconds when the tempo is 56 bpm.

In order to achieve a loop that is within 30 seconds, where the bpm is lower than 56 bpm, e.g., 40 bpm, fewer bars are needed (e.g., 4 bars).

In the case where a longer loop is desired, the length of the N-bar window would be adjusted accordingly. The faster the tempo, the shorter the loop. Thus, if the tempo is faster such that the loop would be, for example 10 seconds long using a 4-bar window, the length of the N-bar window would be increased to obtain a longer loop, for example, to 16 bars.

Search zone 384 is defined as the duration of the media content item 306 minus an introduction section (S1) 386 and an outro section (S2) 388. In one embodiment, search zone 384 is defined as the duration of the media content item 306 minus an introduction section (S1) 386 that is n % beats of the media content item 102, and an outro section (S2) 388 that is m % beats of the media content item 306, e.g. n=25, and m=33. The values of n and m determine the extent to which the introduction and outro are cut out. In one embodiment, these values are selected empirically.

In another embodiment, n and m can be determined by performing a sectional analysis, for example, by determining any relatively dramatic variations of the media content in time. For example, a sectional audio analysis can be performed on the media content item to determine changes in chorus, start of a verse, a bridge, and the like.

Referring again to FIG. 8, at operation 356, after an N-bar window and search zone are defined (operations 352 and 354), for every bar in the search zone 384, a pitch vector representation of the bar and a timbre vector representation of the bar are computed.

An m-dimensional pitch vector can be computed, for example, based on chromas and beats, where m equals the number of chromas multiplied by the number of beats per bar, e.g., 12 chromas×4 beats=a 48-dimensional pitch vector. An n-dimensional timbre vector representation of the bar can be computed, for example, based on the number of timbre coefficients and number of beats, where n equals the number of timbre coefficients times the number of beats per bar, such as 12 timbre coefficients×4 beats=a 48-dimensional timbre vector.

At operation 358, moving one bar at a time, the distance (d) between sections of bars, that is, between bar i and bar i+N (e.g., N=8, i=1, 2, ..., N) for both pitch and timbre are computed. This is accomplished, for example, by determining the Euclidean distance or cosine distance between bar i and bar i+N.

In one approach (labeled as Approach 1 in FIG. 8), the average energy of the section bar i to bar i+(N−1) is computed (e.g., for N=8 bars; i=1, 2, ..., N), as shown in operation 260. This is performed, for example, by averaging the energies of every segment within the section.

At operation 362, the bars are then sorted by pitch distance in increasing order, and P % of the top bars are retained, e.g. 50%. That is, only the bars that have the closest pitch content similarity to bar+N (e.g., N=8) are kept. P is selected based on how much of a filtering weight is given to pitch (also referred to as a "pitch filtering weight"). When P is high, pitch has a lower filtering weight. Most of the potential loops having a high P would thus remain and only the lower ranked ones would be filtered out.

At operation 364, the remaining bars are sorted by timbre distance in increasing order, and T % of the top bars are retained, e.g. 50%. That is, only the bars that have the closest timbre content similarity to bar+N (e.g., N=8) are kept (e.g., 25% of the bars remain). T is selected based on how much of a filtering weight is given to timbre (also referred to as a "timbre filtering weight"). When T is high, timbre has a lower filtering weight. Most of the potential loops having a high T would thus remain and only the lower ranked ones would be filtered out.

In one embodiment, the percentages of pitch and timbre, respectively, (P % and T %) can be selected based on certain assumptions. For example, P and T can be selected based on the genre of the media content item. In the case of classical music, on one hand, pitch may matter more than timbre. In the case of techno music, on the other hand, timbre may matter more than pitch.

At operation 366, using the average energy of the bars within the loop, the bar with the highest energy (i.e., the section bar i to bar i+7 with highest average energy) is selected from among the remaining sections of the media content item.

In one example embodiment, the most energetic remaining N bars (e.g., N=8) are utilized to capture from the media content item the media content of interest.

In an alternative approach (labeled as Approach 2 in FIG. 8) instead of selecting the top N bars as in Approach 1 (described above), the ranks are weighted and accumulated instead, e.g., FinalRank=C1×RankTimbre+C2×RankPitch+C3×RankEnergy, where Ci are weight coefficients, where "i" is an integer, as shown in operation 370. In this embodiment, instead of determining the pitch, timbre and energy ranking of the top N bars in sequence, the pitch, timbre and energy vectors are combined and the processed bars are ranked based on the weighting of the vectors. Coefficients C1, C2, and C3 can be optimized based on a statistical analysis of several tracks, using for example, a neural network that learns based on loops that have been predetermined to be exemplary (i.e., relatively ideal) loops. By analyzing several loops, the coefficients of ideal loops can be extrapolated to a test media content item.

Once the N-bar loop (e.g., N=8) has been found according to one of the above-described approaches, the corresponding portion of the media content item is extracted.

FIG. 10 illustrates a preview portion of duration T (e.g., T=30 seconds) in accordance with an example embodiment.

To provide smooth transitions when looping, a preview portion 400 is prepended with a crossfade b 410 having a length D (e.g., D=a quarter of a beat long or 1/16 of a bar) between section A 408 and section B 412 where section A 408 is the section starting at $T_0$–D (with $T_0$ being the time onset of the first beat of the loop section 392) and section B 412 the section starting at $T_N$–D (with $T_N$ being the time onset of the (N+1)th bar; e.g., where N=8 and N+1=the 9th bar). The loop end point is thus $T_N$–D (e.g., $T_N$–D).

A crossfade a' 406 is generated to overwrite original a 404 by combining the original a 404 with the original b 410. For example, the crossfade a' 406 can be an equal-power sum of a fade-in of the original a 404 (e.g., $f_i(a)$ plus a fade-out of original b 124 ($f_o(b)$) followed by an audio limiter. This ensures that sample $T_N$–D is equal to sample $T_0$–D, and that looping is unnoticeable without requiring any processing work on the client side. This also allows for implementation of a circular buffer from ($T_0$–D) to ($T_N$–D), i.e. of duration $T_N$-$T_0$, for storing the loop.

The crossfade a' 406 can then be prepended in place of the original a 404.

In an example embodiment, at playback, the prepended crossfade a' 406 can be skipped the first time the loop is played.

The audio samples are, in turn, extracted from $T_0$–D to $T_0$–D+T to obtain a second preview of duration T (e.g., T=30 seconds), and the corresponding metadata can be attached to the header of the compressed audio file, e.g., mp3, including preview onset O=$T_0$–D, loop point position L=($T_N$–D)–($T_0$–D), duration D, beat locations, downbeat location, and the like.

In one embodiment, the above-described approach implements one pass through the analysis data. In another example implementation, a self-similarity analysis can be performed on the media content item in order to detect actual section repetitions, e.g. the chorus. Section boundaries can then be used to start the preview at the onset of a musical pattern or phrase: e.g. the strict beginning of the chorus.

The example embodiments described herein can be applied to previewing media content items such as an audio object. In one example embodiment, previews that capture a "hook" of a song as a proxy for what might be considered the most exciting, representative, or interesting section of the song are provided. Such preview can include the chorus or the most repeated and memorable melody, riff or pattern.

Figure 11:
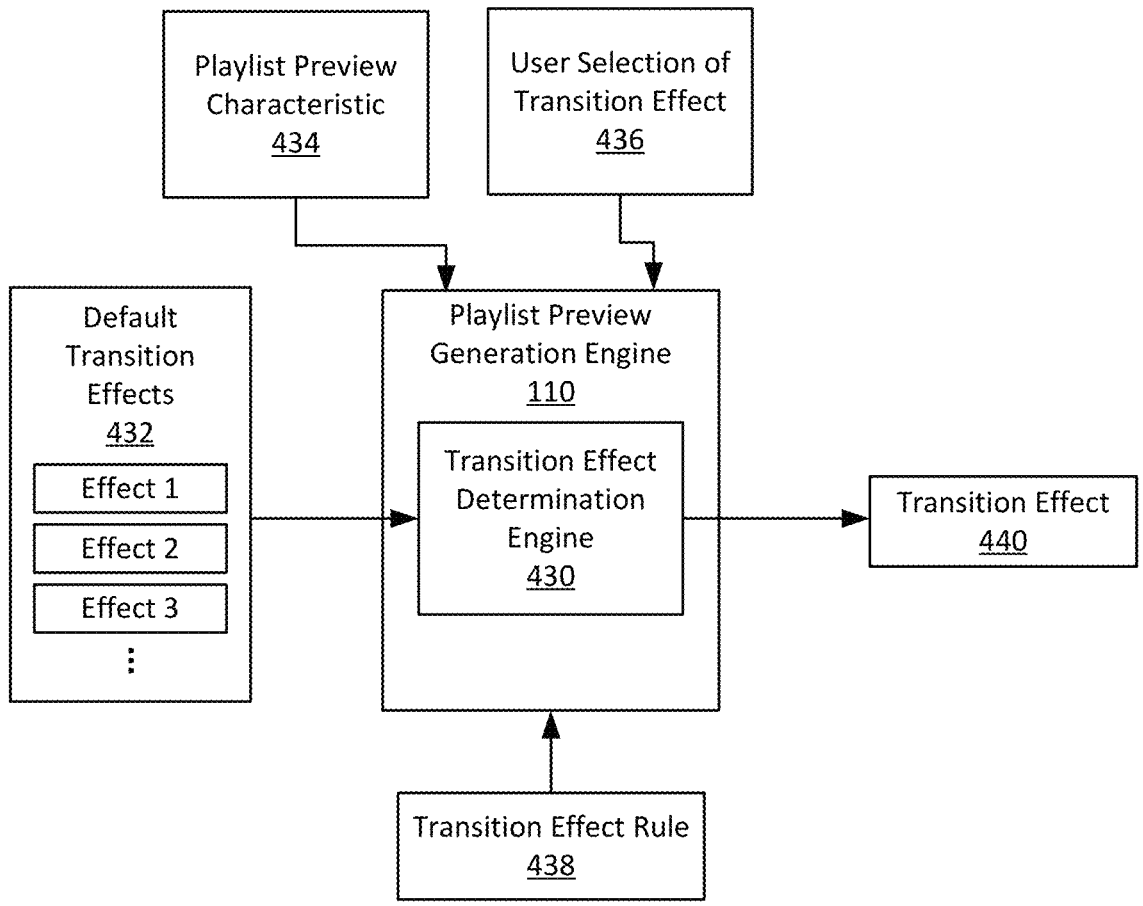
FIG. 11 illustrates an example system for determining a transition effect.

FIG. 11 illustrates an example system for determining a transition effect. In this example, a transition effect determination engine 430 operates to determine a transition effect. In some embodiments, the engine 430 is used to perform the operation 240 in the method 230 as described in FIG. 4.

In some embodiments, the media delivery system 104 includes the transition effect determination engine 430, which can be included in the playlist preview generation engine 110. In this example, the media delivery system 104 including the transition effect determination engine 430 is primarily described as performing the selection of media content items for the playlist preview. In other embodiments, however, other devices, such as the media playback device 102, can be used independently or along with the media delivery system 104 to select media content items for the playlist preview.

The transition effect 440 includes a sound effect configured to be inserted between two preview portions arranged adjacent in a playlist preview, and thus can provide a smooth and customized effect between the preview portions that are played in sequence. Various types of transition effects can be created and used to provide various themes to playlist previews.

In some embodiments, a plurality of transition effects 432 are generated and provided by default. In some examples, the transition effect determination engine 430 can automatically select one or more from the default transition effects 432 which are suited for a playlist preview to be generated. For example, the transition effect determination engine 430 determines a characteristic 434 of the playlist preview, and identifies a transition effect that is suited for the characteristic of the playlist preview. In some embodiments, the playlist preview characteristic can be determined based on metadata of the playlist associated with the playlist preview or metadata of the selected media content items for the playlist preview. Other methods can be used to determine the characteristic of the playlist preview in other embodiments.

In some embodiments, a transition effect rule 438 is provided to the transition effect determination engine 430 and used to select a transition effect 440 to be used for the playlist preview. In some examples, the transition effect rule 438 associates the default transition effects 432 with different characteristics of playlist previews. According to the transition effect rule 438, various factors can be used to match the default transition effects 432 different playlist preview characteristics 434. Examples of such factors include genre, era, record type, category, classification, and context or situation in which the playlist preview is played.

Alternatively or in addition, one or more transition effects can be manually selected by a user. In some embodiments, the transition effect determination engine 430 operates to receive a user selection 436 of a transition effect. For example, the media playback device 102 provides a user interface for receiving a user input of a transition effect for the playlist preview. An example of the user interface illustrated with reference to FIG. 19.

The default transition effects 432 can have various themes. Some examples of such themes include "FM Radio" which sounds like static or switching channel, suitable for a playlist preview having a classical characteristic, "Vinyl" which sounds like needle, dust, skips, scratches, or thin sound, suitable for a playlist preview having an old music style, "Tape" which sounds like fast forwarding, rewinding, or button clicks, suitable for a playlist preview of the 80s music, "DJ" which sounds like beatmatching, crossfading, DJ sound effects, or filters, suitable for a playlist preview of electronic style, "Party" which sounds like crowd, shouts, or clapping, suitable for a playlist preview of pop music, "Mosh Pit" which sounds like screams, rumbling, scraping, or guitar crunch, suitable for a playlist preview of metal or hardcore music, "TV" which sounds like TV static, buttons, or hertzian connection, suitable for a playlist preview of soundtracks, "Beach" which sounds like waves, birds, or wind, suitable for Latin music, "Underwater" which sounds like blur, water, bubbles, or muffle, suitable for a playlist preview of ambient or dreamy music, "Yoga" which sounds like soothing drones, singing bowls, wind, or breathing, suitable for a playlist preview of relaxation or meditation style music, "City" which sounds like street sounds or cars, suitable for a playlist preview of hip hop style, "Geek" which sounds like video games, keyboards, or beeps, suitable for a playlist preview of computer style music, "Space" which sounds like spacey-echo, lasers, beeps, or static, suitable for playlist preview of sci-fi style characteristic, "Seasonal" which sounds like Christmas, Halloween, Easter, or other holidays, suitable for a playlist preview of celebrating music, "Event" which sounds like Star Wars launch, elections, or anniversaries, suitable for a playlist preview of special music, "Girl Talk" which sounds like girl-talk style mashup, suitable for a playlist preview of mashup music, and "Others" which sounds like various situations, such as gym, funny, location based, photo, live concert, etc.

In other embodiments, the transition effect can include no sound effect between preview portions. In this configuration, no sound effect is provided during transitions between the preview portions of selected media content items when played back.

Figure 12:
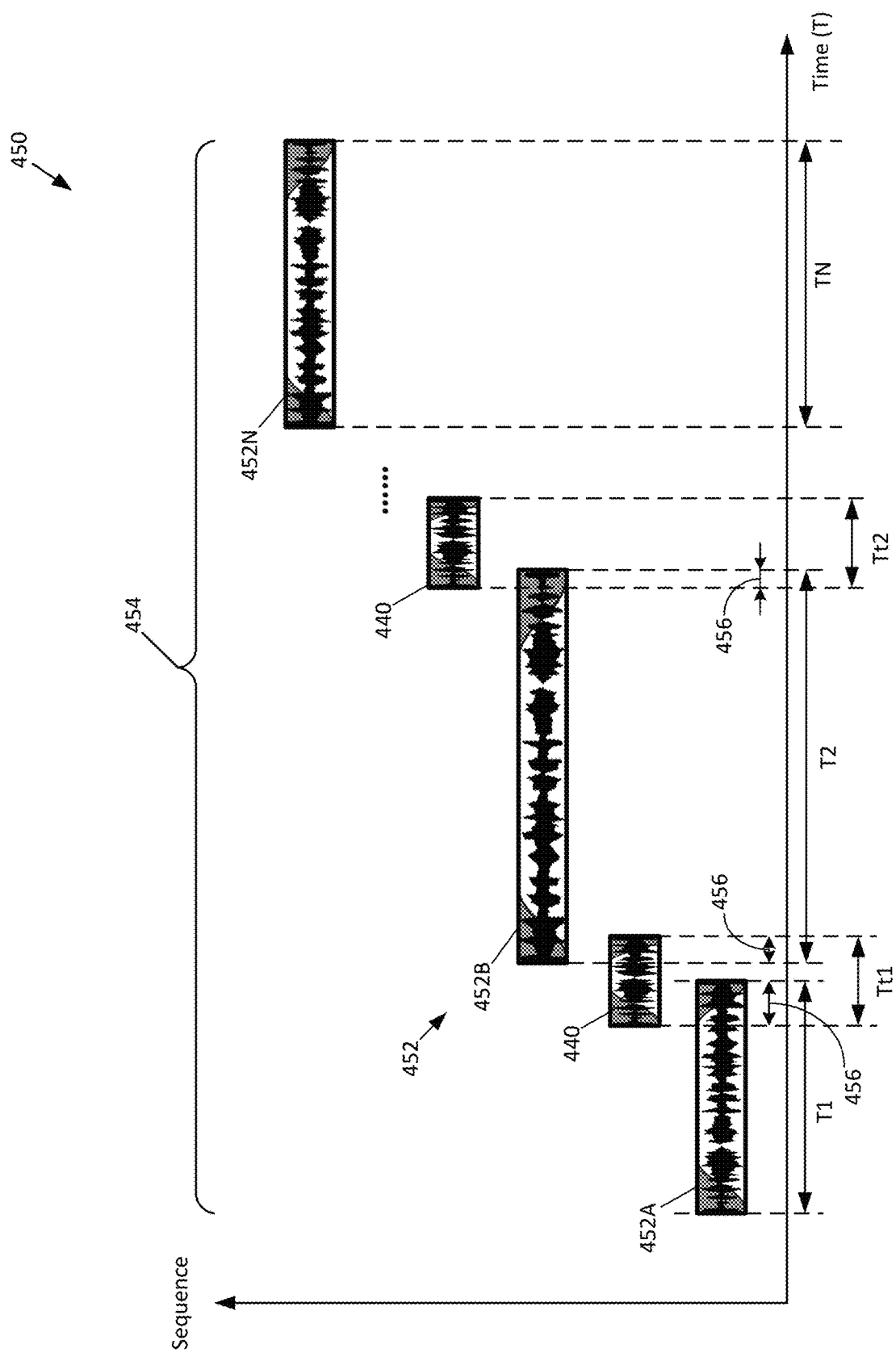
FIG. 12 is a graphical illustration for arranging the preview portions of selected media content items.

FIG. 12 is a graphical illustration 450 for arranging the preview portions of selected media content items. In some embodiments, the illustration 450 represents the operation 242 in the method 230 as described in FIG. 4. In the illustration 450, the horizontal axis represents time (T) and the vertical axis represents the sequence of the preview portions 452 and the transition effects 440.

The processes performed in the illustration are described as being performed in the media delivery system 104 either independently or in cooperation with the media playback device 102. However, in other embodiments, only some of the processes can be performed by the media delivery system 104. In other embodiments, all or some of the processes are performed by the media playback device 102. In yet other embodiments, all or some of the processes are performed by both of the media delivery system 104 and the media playback device 102 in cooperation.

In this example, the media delivery system 104 operates to arrange preview portions 452 (including 452A, B, . . . , and N) of the selected media content items 306 and generate an audio object 454 of the playlist preview. As described herein, in some examples, the preview portions 452 can be obtained as the preview portions 400. In addition, the transition effect 440 can be arranged between the preview portions 452.

The preview portions 452 of the selected media content items 306 are determined to have lengths in time (durations) $T_1, T_2, \ldots, T_N$. As described herein, the durations of preview portions 452A, 452B, . . . , 452N can be consistent among all the selected media content items 306 in some embodiments. In other embodiments, at least one of the preview portions 452A, 452B, . . . , 452N has a different duration than the other preview portions.

In other embodiments, the lengths of the preview portions 452 can be determined or adjusted based on the number of beats. For example, the preview portions 452 can be made to have the same number of beats, which may or may not have the same length in time.

In some embodiments, the preview portions 452 can be initially generated to have the same lengths, at least one of which can be later adjusted as necessary. In other embodiments, at least one of the preview portions 452 can be initially generated to have a different length than the other preview portions. The lengths of the preview portions 452, after generated, can be adjusted as needed.

As described herein, the transition effect 440 can be arranged between the preview portions 452. In some embodiments, the transition effect 440 is consistent throughout the playlist preview. In other embodiments, the transition effect 440 can vary between different transitions, such as between a first transition duration $T_{t1}$ and a second transition duration $T_{t2}$. In some embodiments, the lengths of transition effect 440 can be consistent throughout the playlist preview. In other embodiments, the transition effect 440 can have a different length for at least one transition than for the other transitions.

In some embodiments, the preview portions 452 and/or the transition effect 440 can partially overlap each other as illustrated as transitioning portions 456. In some embodiments, the transitioning portions 456 include crossfading. Various crossfading techniques can be used.

The preview portions 452 can be ordered in various ways. In some embodiments, the preview portions 452 can be arbitrarily arranged. In other embodiments, the preview portions 452 are ordered based on one or a combination of acoustic properties, such as tempo, energy, timber, etc. For example, the preview portions 452 are ordered based on tempo. By way of example, the preview portions 452 can be sequenced by increasing tempo (such as from a slower tempo to a faster tempo), by decreasing tempo (such as from a faster tempo to a slower tempo), by an alternating pattern of tempo, or by a random pattern of tempo. In another example, the preview portions 452 are sequenced based on energy, such as by increasing energy (such as from a lower energy to a higher energy), by decreasing energy (such as from a higher energy to a lower energy), by an alternating pattern of energy, or by a random pattern of energy.

Figure 13:
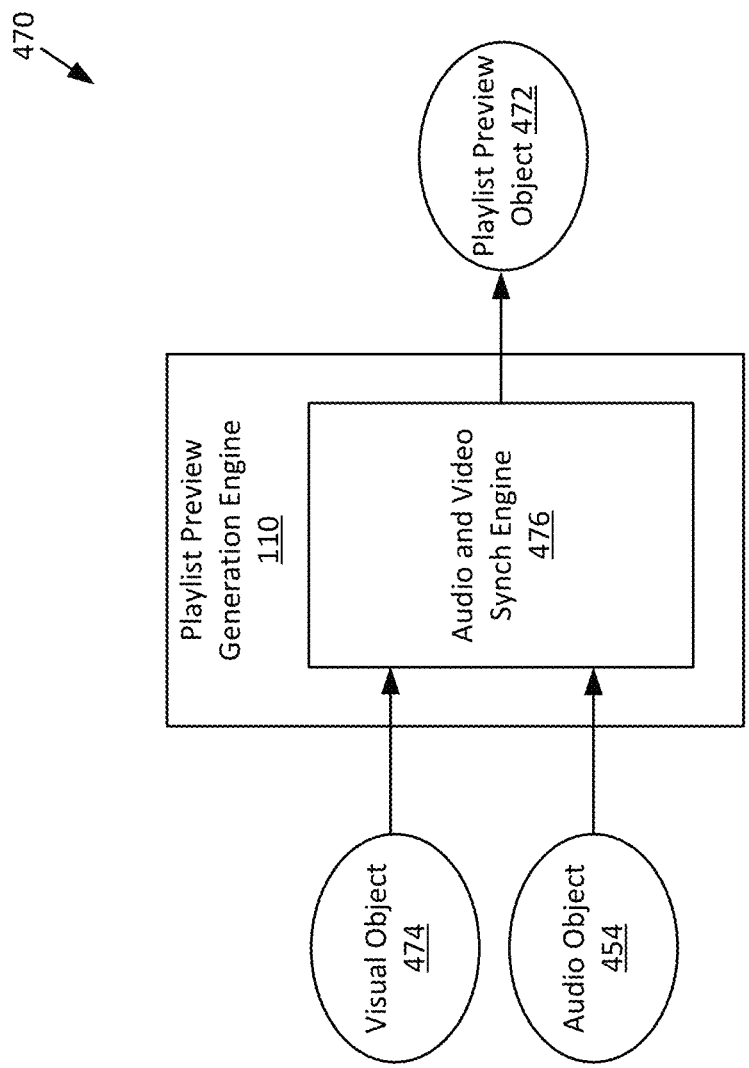
FIG. 13 illustrates an example system for generating a playlist preview object based on an audio object and a visual object.

FIG. 13 illustrates an example system 470 for generating a playlist preview object 472 based on the audio object 454 and a visual object 474. In this example, an audio and video synch engine 476 operates to combine the audio object 454 and the visual object 474. In some embodiments, the engine 476 is used to perform the operation 244 in the method 230 as described in FIG. 4.

In some embodiments, the media delivery system 104 includes audio and video synch engine 476, which can be included in the playlist preview generation engine 110. In this example, the media delivery system 104 including the audio and video synch engine 476 is primarily described as performing the selection of media content items for the playlist preview. In other embodiments, however, other devices, such as the media playback device 102, can be used independently or along with the media delivery system 104 to select media content items for the playlist preview.

Figure 21:
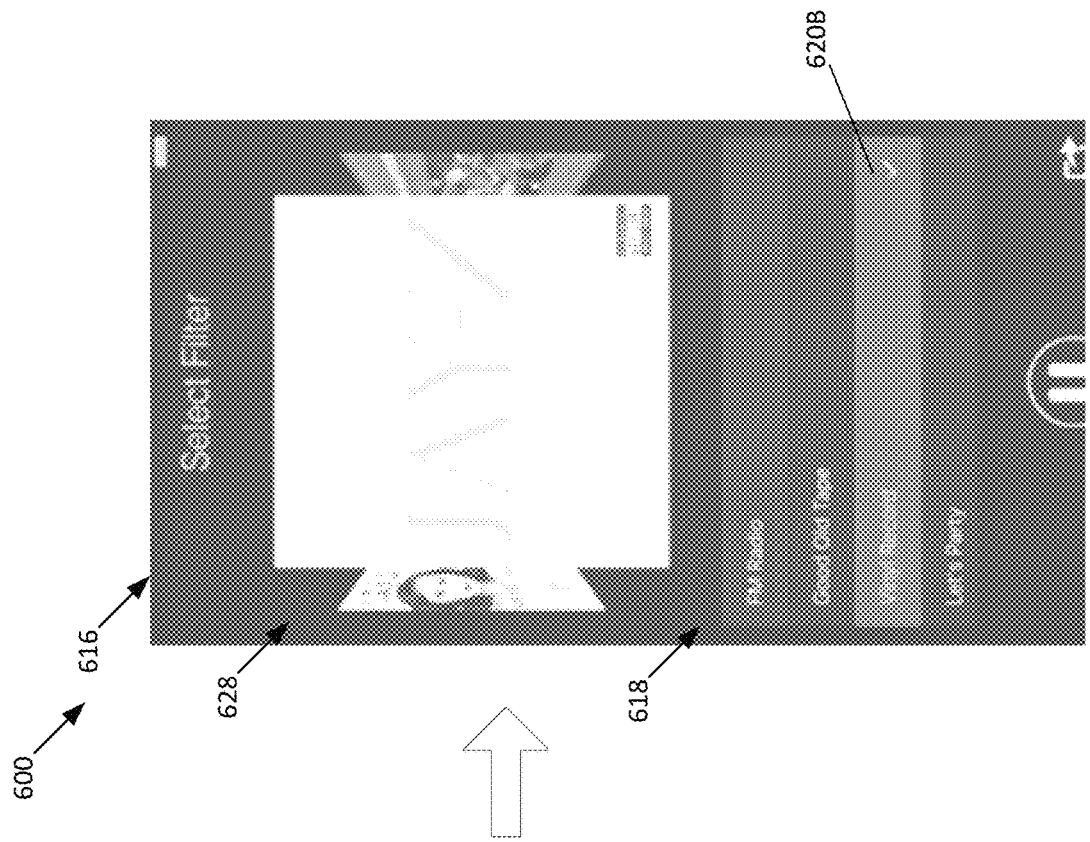
FIG. 21 illustrates an example graphical user interface of the media playback device for generating and editing a playlist preview.
Figure 21:
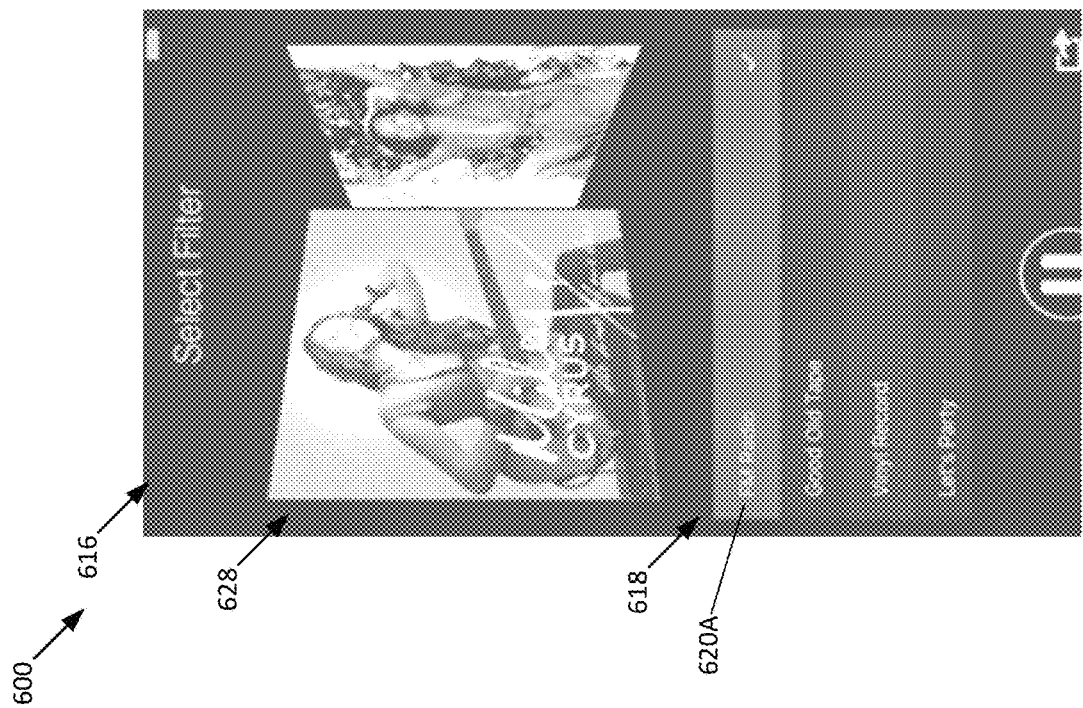

In some embodiments, the playlist preview includes a visual effect (such as a visual object 628 in FIG. 21) to provide a visual preview of the playlist as well. The visual object 474 includes data usable to present such a visual effect for the playlist preview. Various visual effects can be used. In one example, album cover images associated with the selected media content items can be included in the visual effect. As illustrated in FIG. 21, the album covers are synchronized with the corresponding preview portions and displayed when the preview portions are played back. In another example, all or a portion of lyrics associated with the selected media content items are included in the visual effect. Other simple or sophisticating visual effects are possible in other examples.

In some embodiments, the visual effect can include a visual transition effect, which is synchronized with the transition effect 440 in the playlist preview. As illustrated in FIG. 21, by way of example, the visual transition effect can be a page-turning motion between the album cover images. Other visual transition effects are also possible in other examples.

In some embodiments, the visual transition effects can be provided and selected in a method and principle similar to the transition effect 440 as described above.

Referring still to FIG. 13, the audio and video synch engine 476 operates to receive the audio object 454 and the visual object 474, and generate the playlist preview object 472 by synchronizing the audio object 454 with the visual object 474.

In some embodiments, the playlist preview object 472 includes a script usable to retrieve and run the playlist preview. The playlist preview object 472 can be configured as a single file that can be transmitted to a user's computing device, such as the media playback device 102 or the user computing device 106, so that the user can share the playlist preview object 472 with other users. As described herein, the playlist preview object 472 can be shared on a social networking service 122. A user can post the playlist preview object 472 on a social networking site so that other users can watch the playlist preview associated with the playlist preview object 472. In other embodiments, the playlist preview can be shared in various ways using the playlist preview object 472.

Referring now to FIGS. 14-21, various operations of the media playback device 102 are described.

Figure 14:
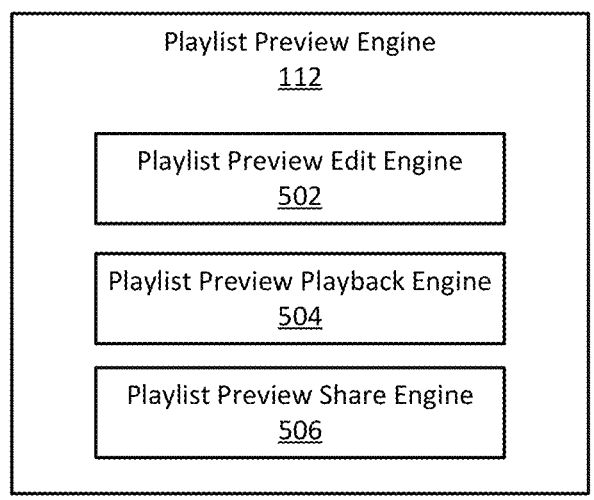
FIG. 14 illustrates an example playlist preview engine of the media playback device.

FIG. 14 illustrates an example of the playlist preview engine 112 of the media playback device 102. In this example, the playlist preview engine 112 includes a playlist preview edit engine 502, a playlist preview playback engine 504, and a playlist preview share engine 506.

The playlist preview edit engine 502 operates to edit a playlist preview that has been generated by, for example, the media delivery system 104. In other embodiments, the playlist preview edit engine 502 can operate to edit a playlist preview that was previously created by the media playback device 102. As described herein, the playlist preview edit engine 502 operates to provide a user interface for receiving a user request for modification of the playlist preview.

The playlist preview playback engine 504 operates to playback a playlist preview on the media playback device 102. In some embodiments, the playlist preview playback engine 504 can include, be included in, or be part of, the media playback engine 146, as illustrated in FIG. 2.

The playlist preview share engine 506 operates to share a playlist preview with other users using user computing devices 116.

Figure 15:
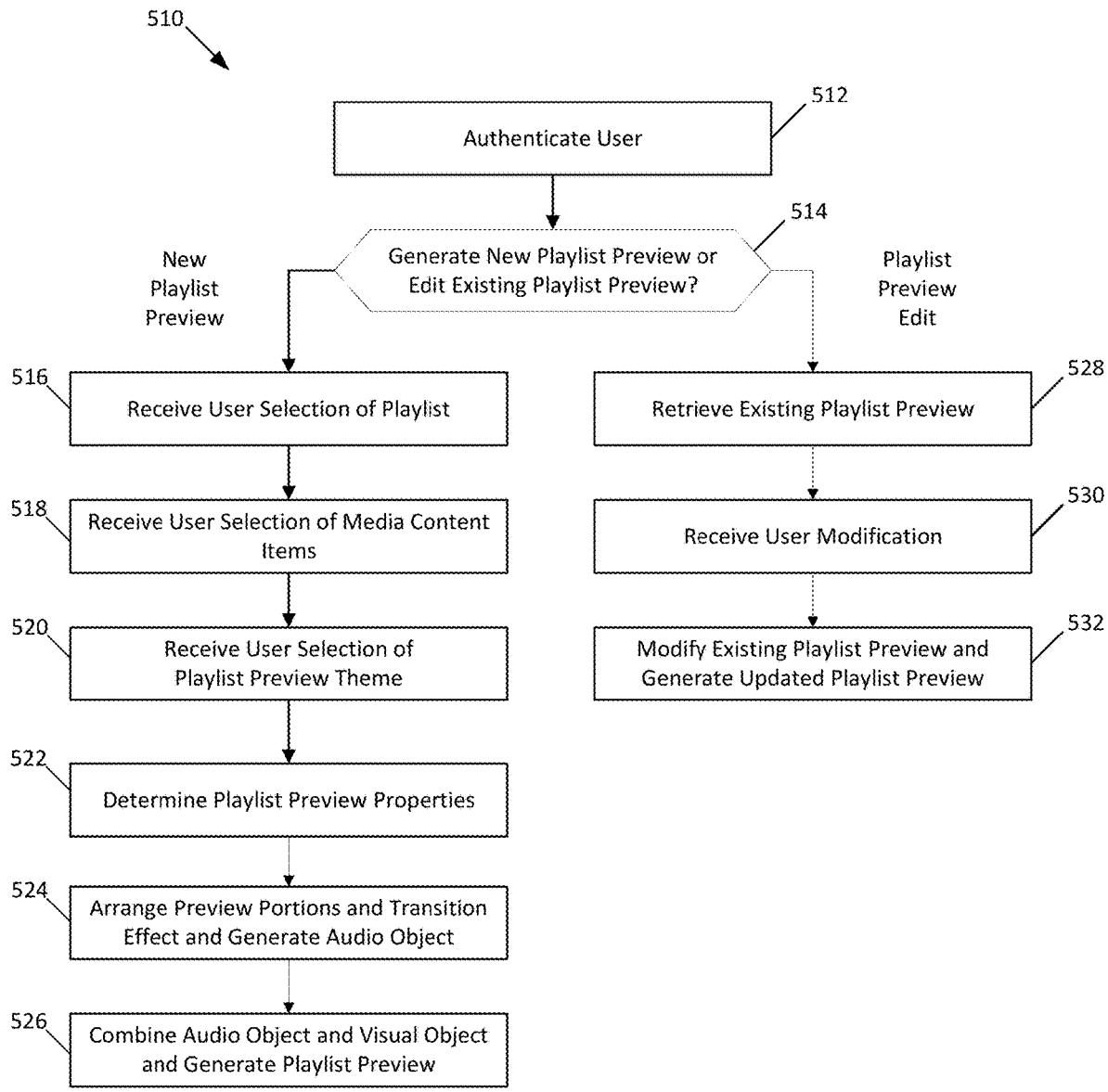
FIG. 15 illustrates an example method of generating or editing a playlist preview using the media playback device.

FIG. 15 illustrates an example method 510 of generating or editing a playlist preview using the media playback device 102. In this example, the method 510 is described with further reference to FIGS. 16-21, which illustrate an example graphical user interface 600 of the media playback device 102 for generating and editing a playlist preview.

Figure 16:
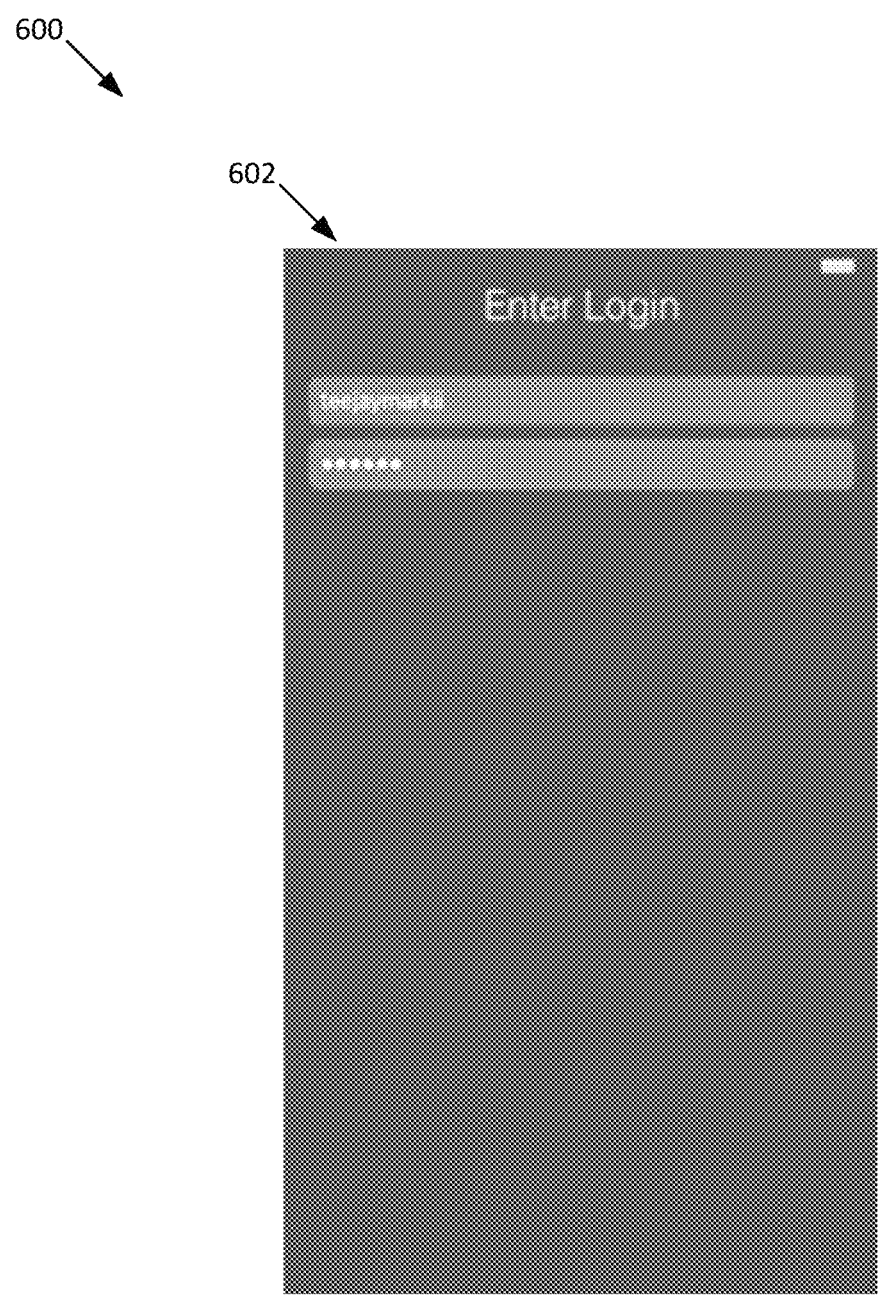
FIG. 16 illustrates an example graphical user interface of a media playback device for generating and editing a playlist preview.

The method 510 can begin at operation 512 in which the media playback device 102 operates to authenticate a user of the media playback device 102. As illustrated in FIG. 16, for example, an authentication page 602 (titled "Enter Login" in this example) is presented on the media playback device 102 and enables a user to enter authentication information, such as a user ID and password. Alternatively or in addition, other types of authentication are also possible.

At operation 514, the media playback device 102 determines whether a new playlist preview is generated or an existing playlist preview is edited. For example, the media playback device 102 provides a user interface to receive a user request for generating a new playlist preview or for selecting and editing an existing playlist preview. If it is determined that a new playlist preview is generated ("New Playlist Preview" at this operation), the method 510 moves on to operation 516. If it is determined that an existing playlist preview is edited ("Playlist Preview Edit" at this operation), the method 510 continues at operation 528.

Figure 17:
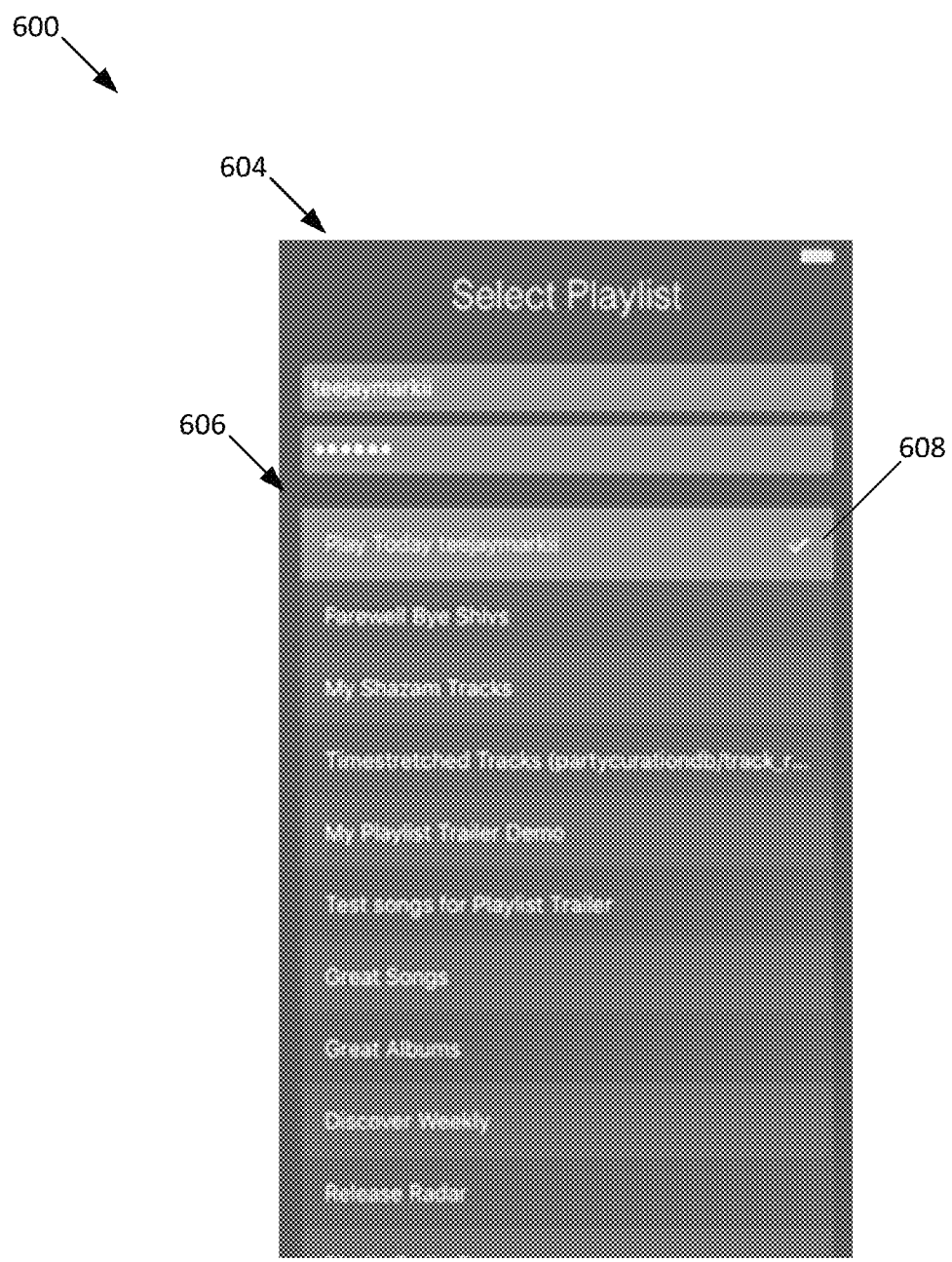
FIG. 17 illustrates an example graphical user interface of the media playback device for generating and editing a playlist preview.

At operation 516, the media playback device 102 receives a user selection of a playlist. For example, as illustrated in FIG. 17, the media playback device 102 operates to present a playlist selection page 604 (titled "Select Playlist" in this example) that shows a list 606 of playlists available to the user. The user can select a playlist 608 from the list 606.

Figure 18:
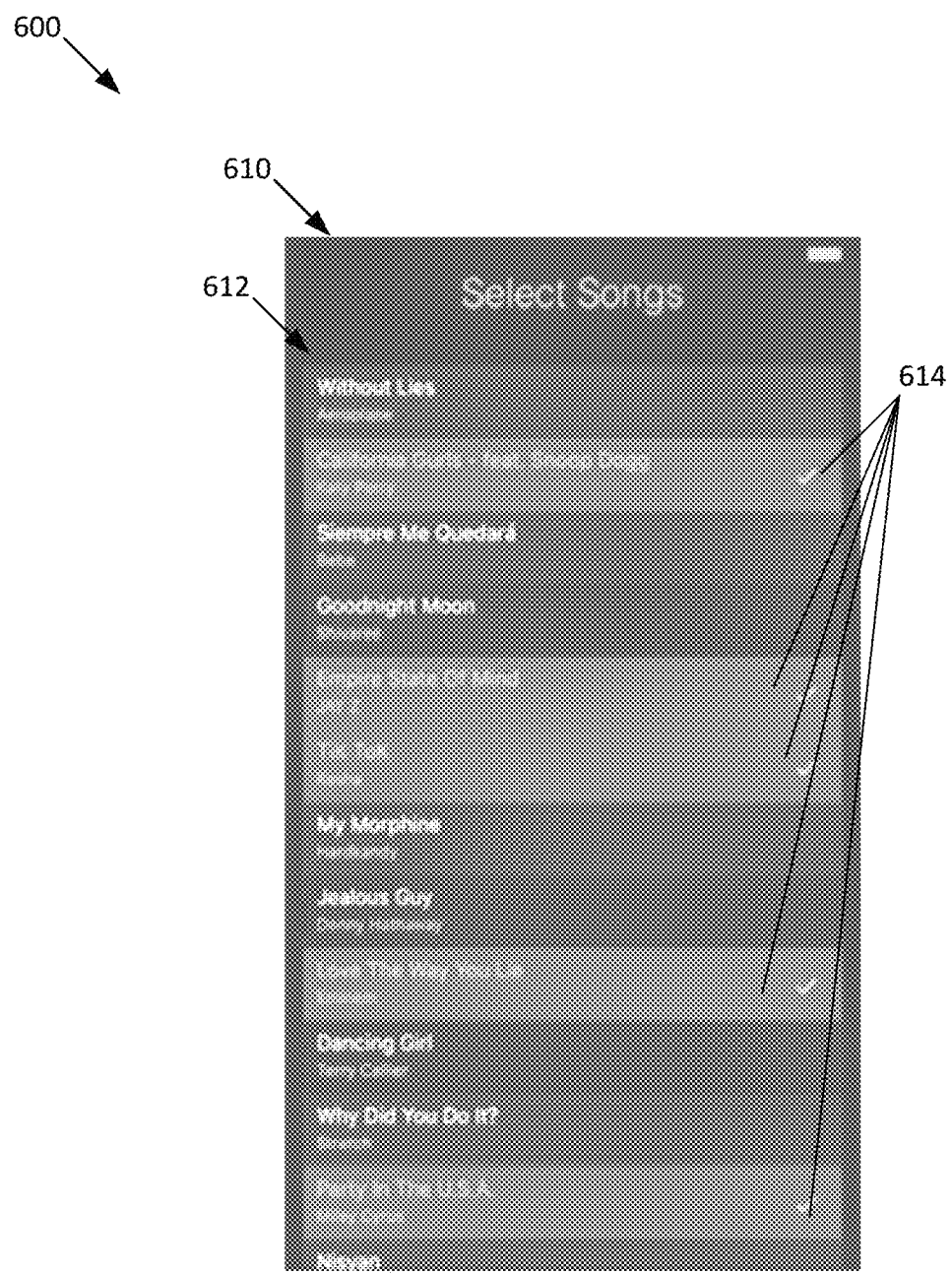
FIG. 18 illustrates an example graphical user interface of the media playback device for generating and editing a playlist preview.

At operation 518, the media playback device 102 receives a user selection of media content items from the selected playlist 608. For example, as illustrated in FIG. 18, the media playback device 102 operates to display an item selection page 610 (titled "Select Songs" in this example) that shows a list 612 of media content items associated with the selected playlist 608. The user can select one or more media content items 614 from the list 612.

Figure 19:
FIG. 19 illustrates an example graphical user interface of the media playback device for generating and editing a playlist preview.

At operation 520, the media playback device 102 receives a user selection of a playlist preview theme. For example, as illustrated in FIG. 19, the media playback device 102 operates to display a theme selection page 616 (titled "Select Filter" in this example) showing a list of themes 618 that can determine the characteristic of the playlist preview. In some embodiments, the playlist preview themes include a list of transition effects, such as the default transition effects 432 as described herein. In FIG. 19, the theme selection page 616 presents a list of default transition effects as the playlist preview themes 618 and enables the user to select one 620 of the default transition effects. In other embodiments, the playlist preview themes can present a list of visual transition effects and enables the user to select one from the list. In yet other embodiments, the playlist preview themes can provide templates for generating playlist previews.

Figure 20:
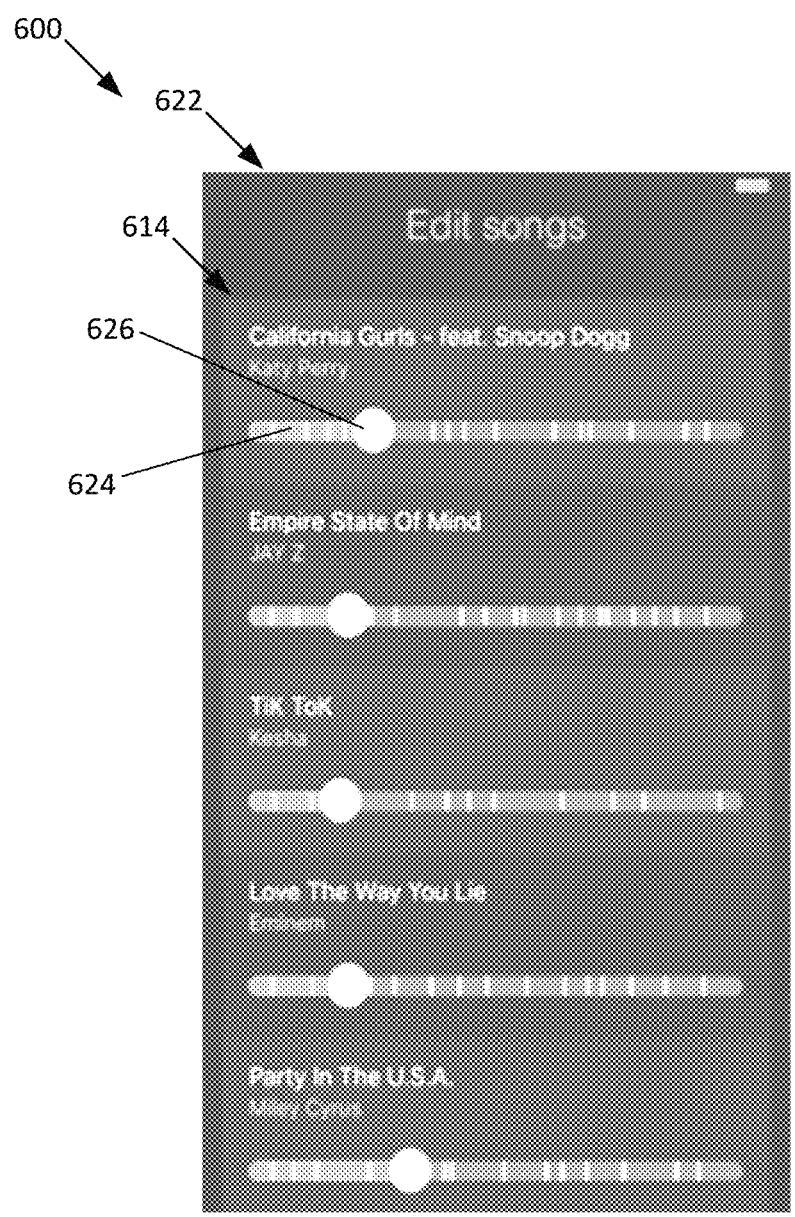
FIG. 20 illustrates an example graphical user interface of the media playback device for generating and editing a playlist preview.

At operation 522, the media playback device 102 determines one or more playlist preview properties. The playlist preview properties include various pieces of information about the playlist preview. Examples of such playlist preview properties include a duration of the playlist preview, a number of media content items included in the playlist preview, a duration of each media content item in the playlist preview, a preview portion of each media content item in the playlist preview, and any other characteristics of the playlist preview. As illustrated in FIG. 20, the media playback device 102 presents a playlist preview characteristic selection page 622 including a list of the selected media content items 614. In some embodiments, the media playback device 102 receives a user input of such playlist preview properties. For example, the user can select and adjust a preview portion 624 of each of the selected media content items 614 using an adjust control 626. As described herein, the preview portion 624 of a media content item can begin from any point (e.g., the beginning or any point in the middle) of the media content item and ends at any other point (e.g., any point in the middle or the end) of the media content item. In other embodiments, the media playback device 102 automatically determines the playlist preview properties as described with reference to FIGS. 4-13.

At operation 524, the media playback device 102 operates to arrange the preview portions and the transition effect, thereby generating an audio object. In some embodiments, the preview portions and/or the transition effect are manually selected by the user as described herein. In other embodiments, the preview portions and/or the transition effect are automatically determined as described with reference to FIGS. 4-13.

At operation 526, the media playback device 102 operates to combine the audio object with a visual object to generate the playlist preview. In some embodiments, the visual object is manually selected by the user. In other embodiments, the visual object is automatically determined to be suitable for the audio object as described with reference to FIGS. 4-13.

At operation 528, the media playback device 102 operates to retrieve the existing playlist preview that the user selects to edit.

At operation 530, the media playback device 102 operates to receive a user input of modification information. In some embodiments, the media playback device 102 provides a user interface, such as the user interface 600 shown in FIGS. 17-20, to receive a user request for editing the playlist preview.

At operation 532, the media playback device 102 operates to modify the playlist preview based on the user request, and generate an updated playlist preview. The playlist preview is modified in the processes similar to those described in the operations 518, 520, 522, 524, and 526.

In some embodiments, the media playback device 102 can play back the playlist preview while the media playback device 102 operates to receive a user input, creates the playlist preview, or modifies the playlist preview. By way of example, as shown in FIG. 21, the media playback device 102 runs the playlist preview while the user selects the transition effect 620. In this example, the user changes the transition effect 620A ("FM Radio") to another transition effect 620B ("Vinyl Record") on the theme selection page 616, while the visual object 628 and the audio object are played back on the media playback device 102.

It is understood that, in other embodiments, the operations in the method 510 can be performed in different orders. In yet other embodiments, one or some of the operations in the method 510 can be omitted or replaced with other operations of the media playback device 102. In yet other embodiments, one or more additional operations are performed along with at least one of the operations in the method 510.

Figure 22:
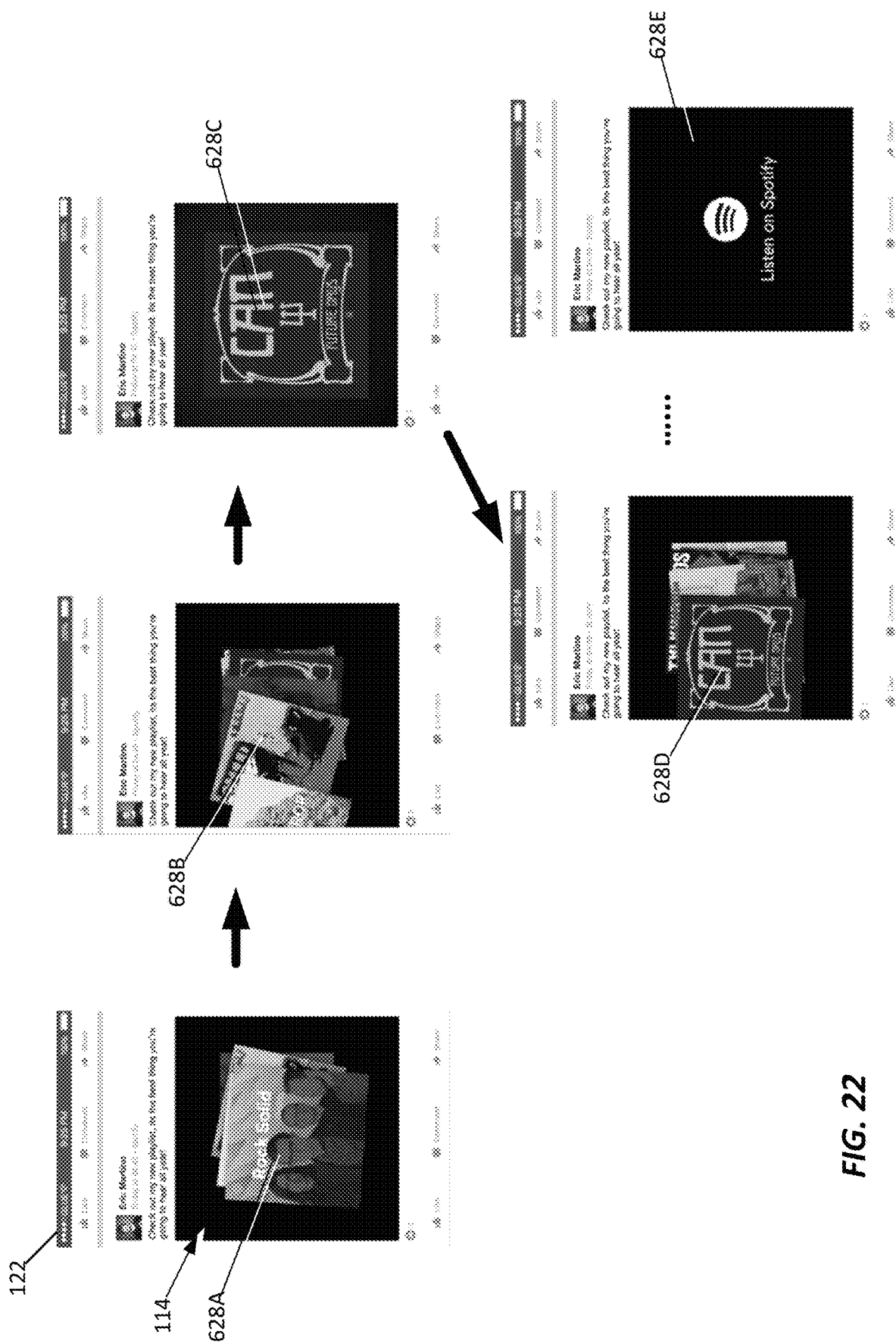
FIG. 22 illustrates an example playlist preview shared and played on an example social networking service.

FIG. 22 illustrates an example playlist preview 114 shared and played on an example social networking service 122. In this example, the visual object 628 (such as from 628A to 628E) is animated and played while the audio object is played back. In some embodiments, the images (such as album covers) in the visual object 628 are clickable and linked to the media content items associated with the images.

In some embodiments, the playlist preview 114 is configured to allow users (e.g., viewers) to navigate the media content items in the playlist preview as the playlist preview runs. By way of example, the user can perform navigation by select, slide, or drag the images in the visual object 628 of the playlist preview 114.

In this example, a user U1 (FIG. 1) of the media playback device 102 shares the playlist preview with another user U2 (FIG. 2) by posting the playlist preview on the social networking service 122. In some embodiments, the social networking service 122 allows the other use U2 to initiate the post and access one or more media content items associated with the preview portions in the playlist preview. For example, the user can select a preview portion that is being played in the playlist preview, which causes a related application or website to launch and play back the media content item associated with the selected preview portion. In other examples, such a media content item can be played on the social networking service 122 when the preview portion is selected.

It is understood that, in other embodiments, at least some of the functions and operations of the playlist preview generation engine 110 and/or the playlist preview engine 112, as described herein, can be incorporated in the social networking service 122 so that the playlist preview can be created or edited through the social networking service or by a user using the social networking service.

It is also understood that the playlist preview can be posted and shared in other websites, mobile applications, or services. For example, the playlist preview is provided in a website or mobile application provided using the media delivery system 104.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for creating a media playlist preview for a media playlist, the media playlist having a plurality of media content items, the method comprising:
   automatically identifying, using at least one computing device, a subset of the plurality of media content items of the media playlist;
   determining preview portions of the subset of the plurality of media content items;
   arranging the preview portions of the subset of the plurality of media content items; and
   generating a playlist preview object, distinct from the media playlist, for the media playlist preview, the playlist preview object identifying an arrangement of the preview portions, wherein the playlist preview object is sharable with at least one other user of a media streaming service.

2. The method of claim 1, further comprising:
   determining a transition effect; and
   arranging the transition effect between adjacent preview portions of the subset of the plurality of media content items,
   wherein the audio object identifies an arrangement of the preview portions and the transition effect.

3. The method of claim 1, wherein automatically identifying a subset of the plurality of media content items includes:
   selecting the subset of the plurality of media content items from the media playlist, the media playlist identifying media content items including the plurality of media content items.

4. The method of claim 3, wherein the subset of the plurality of media content items is selected based on at least one of popularity, user preference, representativeness, and uniqueness of the media content items identified by the media playlist.

5. The method of claim 1, wherein identifying a subset of the plurality of media content items includes:
   receiving a user selection of the subset of the plurality of media content items from the media playlist.

6. The method of claim 1, further comprising:
   receiving a user input of the preview portions of the subset of the plurality of media content items.

7. The method of claim 1, further comprising:
   transmitting metadata of the media playlist preview to a computing device, the metadata including data usable to share the media playlist preview with the at least one user of the media streaming service.

8. The method of claim 1, wherein the playlist preview object includes a script usable to retrieve and run the playlist preview.

9. The method of claim 1, further comprising generating a link associated with the playlist preview object, and providing the link to a user to permit the user to share the playlist preview object with the at least one other user.

10. The method of claim 9, wherein the link associated with the playlist preview object is sharable on a social networking service.

11. The method of claim 10, wherein the link is a link to a media streaming service, wherein the link is usable to cause the playlist preview to be played to the at least one other user through the media streaming service.

12. A media delivery system for delivering a media content playlist to a media playback device, the media playlist having a plurality of media content items, the media delivery system comprising:
a processing device;
a media data store storing a plurality of playlists; and
a computer readable data storage medium storing software instructions that, when executed by the processing device, cause the media delivery system to:
automatically identify, using at least one computing device, a subset of the plurality of media content items of the media playlist;
determine preview portions of the subset of the plurality of media content items;
determine a transition effect;
arrange the preview portions of the subset of the plurality of media content items and the transition effect, the transition effect arranged between adjacent preview portions; and
generate an audio object, distinct from the media playlist, for the media playlist preview, the audio object identifying an arrangement of the preview portions and the transition effect, wherein the audio object is shareable with users of a media streaming service.

13. The media delivery system of claim 12, wherein automatically identifying a subset of the plurality of media content items includes:
selecting the subset of the plurality of media content items from the media playlist, the media playlist identifying media content items including the plurality of media content items.

14. The media delivery system of claim 13, wherein the subset of the plurality of media content items is selected based on at least one of popularity, user preference, representativeness, and uniqueness of the media content items identified by the media playlist.

15. The media delivery system of claim 12, wherein the software instructions further cause the media delivery system to:

transmit metadata of the media playlist preview to a computing device, the metadata including data usable to share the media playlist preview with the users of the media streaming service.

16. The system of claim 12, further comprising generating a link associated with the playlist preview object, and providing the link to a user to permit the user to share the playlist preview object with the at least one other user.

17. The system of claim 16, wherein the link associated with the playlist preview object is sharable on a social networking service.

18. The system of claim 17, wherein the link is a link to a media streaming service, wherein the link is usable to cause the playlist preview to be played to the at least one other user through the media streaming service.

19. A media playback device comprising:
a content output device configured to output a media content playlist selected from media content items, the media playlist having a plurality of media content items;
a processing device; and
a computer readable data storage medium storing software instructions that, when executed by the processing device, cause the media playback device to:
receive a user selection of the media playlist;
receive a user selection of subset of a plurality of media content items from the media playlist;
determine preview portions of the subset of the plurality of media content items;
arrange the preview portions of the subset of the plurality of media content items; and
generate an audio object, distinct from the media playlist, for the media playlist preview, the audio object identifying an arrangement of the preview portions, wherein the audio object is shareable with users of a media streaming service.

20. The media playback device of claim 19, wherein the software instructions further cause the media playback device to:
receive a user input of a transition effect; and
arrange the transition effect between adjacent preview portions of the plurality of media content items,
wherein the audio object identifies an arrangement of the preview portions and the transition effect.

* * * * *